(12) United States Patent
Wakasugi et al.

(10) Patent No.: US 8,283,285 B2
(45) Date of Patent: Oct. 9, 2012

(54) SCRATCH COLOR-DEVELOPABLE INK AND INVISIBLE INFORMATION PRINTED SHEET

(75) Inventors: Hisashi Wakasugi, Saitama (JP); Fujio Takasaki, Saitama (JP); Kazuhiro Handa, Saitama (JP); Masahiro Miyauchi, Tokyo (JP); Haruhiko Ikeda, Tokyo (JP)

(73) Assignees: Mitsubishi Paper Mills Limited, Tokyo (JP); Tokyo Printing Ink Mfg. Co., Ltd., Tokyo (JP)

( * ) Notice: Subject to any disclaimer, the term of this patent is extended or adjusted under 35 U.S.C. 154(b) by 515 days.

(21) Appl. No.: 12/448,163

(22) PCT Filed: Dec. 19, 2007

(86) PCT No.: PCT/JP2007/075047
§ 371 (c)(1), (2), (4) Date: Jul. 9, 2009

(87) PCT Pub. No.: WO2008/075786
PCT Pub. Date: Jun. 26, 2008

(65) Prior Publication Data
US 2010/0021702 A1 Jan. 28, 2010

(30) Foreign Application Priority Data
Dec. 19, 2006 (JP) .................................. 2006-341531

(51) Int. Cl.
*B41M 5/132* (2006.01)
(52) U.S. Cl. .................................... 503/207; 106/31.41
(58) Field of Classification Search .................. None
See application file for complete search history.

(56) References Cited

U.S. PATENT DOCUMENTS

| | | | | |
|---|---|---|---|---|
| 4,876,233 | A | * 10/1989 | Saeki et al. | 503/209 |
| 5,880,063 | A | * 3/1999 | Hoffman et al. | 503/201 |
| 2005/0075420 | A1 | 4/2005 | Stovold | |

FOREIGN PATENT DOCUMENTS

| | | |
|---|---|---|
| JP | 8-58230 | 3/1996 |
| JP | 8-150796 | 6/1996 |
| JP | 10-16386 | 1/1998 |
| JP | 2006-199887 | 8/2006 |
| JP | 2006-335848 | 12/2006 |
| JP | 2008-24838 | 2/2008 |

OTHER PUBLICATIONS

International Search Report issued Mar. 11, 2008 in the International (PCT) Application of which the present application is the U.S. National Stage along with the Written Opinion of the International Searching Authority.
Kinoseki Ink no Oyo Gijutsu, popular edition, Kabushiki Kaisha CMC Shuppan, Jan. 27, 2003, p. 97, with partial English translation.

* cited by examiner

*Primary Examiner* — Bruce H Hess
(74) *Attorney, Agent, or Firm* — Wenderoth, Lind & Ponack, L.L.P.

(57) ABSTRACT

Disclosed are a scratch color-developable ink comprising an electron-donating colorless or light-color dye precursor, an electron-accepting color developer and a varnish, wherein a solid particle component contained therein has an average particle diameter of 0.3 to 25 μm, a scratch color-developable ink comprising an electron-donating colorless or light-color dye precursor, an electron-accepting color developer and a varnish, wherein an azaphthalide compound is contained as the electron-donating colorless or light-color dye precursor, and an invisible information printed sheet obtained by printing invisible information on a support with the above scratch color-developable ink.

The above scratch color-developable ink makes invisible information visible easily by scratching with a finger nail although the color of an invisible information printed portion is hard to develop by frictional contact during usual handling, gives a high developed color intensity and is free from the occurrence of dust during the visualization of invisible information.

15 Claims, No Drawings

SCRATCH COLOR-DEVELOPABLE INK AND INVISIBLE INFORMATION PRINTED SHEET

TECHNICAL FIELD

This invention relates to a scratch color-developable ink that visualizes pre-formed invisible information by color development based on external friction and an invisible information printed sheet using the same.

BACKGROUND ART

As invisible information printed sheets for lotteries, etc., conventionally, there are generally used sheets obtained by printing win- or losing-showing information of letters, numbers, patterns, etc., on sheets such as sheets of paper and further coating concealing layers thereon to bring the information into an invisible state. Specifically, there can be referred to a sheet that is obtained by printing visible information, etc., on a sheet of paper, etc., further printing information that is to be invisualized, then, forming a peel agent layer so as to cover the information that is to be invisualized and forming a masking concealing ink layer in a sliver color, etc., thereon, and it ensures that when the peel agent layer is scratched off with a coin, etc., the invisible information appears. Available as the above invisible information printed sheet are a sheet obtained by forming a concealing layer such as a concealing ink layer, a metal deposition layer, etc., on a surface having visible information printed thereon and a sheet obtained by forming the concealing layer on the opposite surface. In the latter invisible information printed sheet, it is a precondition that the support thereof should be transparent (JP8-150796A).

Further, there is proposed a printed matter obtained by printing information to be invisualized on a support with an electron-accepting color developer and forming a scratch layer so as to cover the same, the scratch layer having capsules containing an electron-donating colorless or light-color dye precursor dispersed therein each (JP10-16386A).

Since, however, the invisible information printed sheet using a concealing layer such as a concealing ink layer has a defect that scratching dust that occurs during the removal of the concealing layer is a mote, the field of its use is limited. Due to the necessity of increasing the thickness of the concealing layer for concealing information to be invisualized, it has a defect that the concealing layer is liable to peel off due to its frictional contact or its contact to a sharply pointed article. Further, the concealing ink has a dark color or the color of a metallic luster, and it is hence liable to feel dark or liable to have a peculiar appearance, which is liable to pose a problem with regard to a design.

On the other hand, the invisible information printed sheet using capsules containing an electron-donating colorless or light-color dye precursor each and an electron-accepting color developer has a problem that soiling may easily occur or that the invisible information may be easily visualized, since capsules containing the electron-donating colorless or light-color dye precursor may be broken in a processing step or due to a frictional contact during handling. Further, it also has a problem that a portion on which pressure like a writing pressure is exerted develops a color even without any frictional contact. Further, since it uses the copying paper technology that takes no scratching into consideration, an information printed portion may be also scratched off when it is scratched carelessly with a strong force. In the use of an invisible information printed sheet, it is liable to be used roughly in an attempt to know the invisible information quickly, so that it cannot be said to be suitable as an invisible information printed sheet.

Further, there is another invisible information printed sheet that is obtained by printing letters or a pattern on a support by the use of an ink containing, as a main component, a pigment (silicon dioxide, titanium oxide, aluminum oxide, etc.) having higher hardness than a metal material constituting a coin, and that makes the information visible when the metal material is scraped off by rubbing a coin thereon (JP6-78039B).

However, it inconveniently requires a tool such as a coin, etc., and in view of safety and healthfulness, it is not desirable to allow children of tender years to use coins, since they may swallow them by accident or make hands dirty. In many uses, users are grownups, and there can be supposed situations in which children and aged persons are around to play with it or touch it, but no consideration is given to such cases. In the above method, further, the developed color density of printed information during visualization is low, and there can be obtained only a developed color density that is barely visually recognizable.

The above defects, in particular, the problem of scratching dust can be overcome by an ink containing a varnish and containing a colorless or light-color dye precursor and an electron-accepting developer in the form of solid particles each in the varnish, and an invisible information printed sheet that is printed with the ink. However, the existing situation is that invisible information printed sheets are facing a high degree of demands one after another (JP 2006-199887A).

DISCLOSURE OF THE INVENTION

Problems to be Solved by the Invention

It is an object of this invention to provide a scratch color-developable ink that makes invisible information visible easily by scratching with a finger nail although the color of an invisible information printed portion is hard to develop by frictional contact during usual handling, that gives a high developed color intensity, that is free from the occurrence of dust during the visualization of invisible information and that makes it very difficult to visually recognize an invisible information printed portion without developing a color by scratching, and an invisible information printed sheet using the same.

Means to Solve the Problems

The present inventors have made diligent studies and found that the above object can be achieved by a scratch color-developable ink comprising an electron-donating colorless or light-color dye precursor, an electron-accepting color developer and a varnish, wherein solid particle components contained therein have an average particle diameter in a predetermined range, and a scratch color-developable ink comprising an electron-donating colorless or light-color dye precursor, an electron-accepting color developer and a varnish, wherein an azaphthalide compound is contained as the electron-donating colorless or light-color dye precursor, and this invention has been accordingly completed on the basis of the above findings.

That is, this invention provides (1) a scratch color-developable ink comprising an electron-donating colorless or light-color dye precursor, an electron-accepting color developer and a varnish, wherein a solid particle component contained therein has an average particle diameter of 0.3 to 25 µm, (2) a scratch color-developable ink as recited in the above (1), which further contains a pigment, (3) a scratch color-developable ink as recited in the above (1) or (2), wherein the electron-donating colorless or light-color dye precursor and the electron-accepting color developer have a content mass ratio of 1:0.5 to 1:5, (4) a scratch color-developable ink as recited in any one of the above (1) to (3), wherein the electron-donating colorless or light-color dye precursor contains a xanthene compound and the electron-accepting color developer contains a diphenyl sulfone compound, (5) a scratch color-developable ink comprising an electron-donating colorless or light-color dye precursor, an electron-accepting color developer and a varnish, wherein an azaphthalide compound is contained as the electron-donating colorless or light-color dye precursor, (6) a scratch color-developable ink as recited in the above (5), wherein the electron-accepting color developer is a color developer containing a diphenyl sulfone compound, (7) an invisible information printed sheet obtained by printing invisible information on a support with the scratch color-developable ink recited in any one of the above (1) to (6), (8) an invisible information printed sheet as recited in the above (7), wherein the invisible information printed has an ink film thickness of 2.0 μm or less, (9) an invisible information printed sheet as recited in the above (7) or (8), wherein the ratio of glossiness of a printed portion to the glossiness of a non-printed portion on the support surface, as a ratio of 60-degree specular glossiness values according to JIS-K5701-1, is 65% to 150%,

(10) an invisible information printed sheet as recited in any one of the above (7) to (9), wherein the ratio of glossiness of a printed portion to the glossiness of a non-printed portion on the support surface, as a ratio of 75-degree specular glossiness values according to JIS-K5701-1, is 44% to 105%, and

(11) an invisible information printed sheet as recited in any one of the above (7) to (10), wherein the invisible information is that which is printed by offset printing.

EFFECT OF THE INVENTION

According to this invention, there can be provided a scratch color-developable ink that makes invisible information visible easily by scratching with a finger nail although the color of an invisible information printed portion is hard to develop by frictional contact, heat, static pressure, adherence of water, etc., during usual handling, that gives a high developed color density, that is free from the occurrence of dust during the visualization of invisible information and that makes it very difficult to visually recognize an invisible information printed portion without scratch color development, and an invisible information printed sheet using the same.

Further, an invisible information printed sheet using an azaphthalide compound as an electron-donating colorless or light-color dye precursor produces unexpected effects that it performs excellent color development and still makes it difficult to visually recognize invisible information before scratch color development even after it is exposed to light for a long period of time before scratch color development or even after it is placed under high-temperature conditions.

PREFERRED EMBODIMENTS OF THE INVENTION

First, the scratch color-developable ink of this invention will be explained. Hereinafter, the scratch color-developable inks recited in the above (1) to (4) will be generally referred to as "scratch color-developable ink (A)", the scratch color-developable inks recited in the above (5) and (6) will be generally referred to as "scratch color-developable ink (B)", and the scratch color-developable inks (A) and (B) will be generally referred to as "scratch color-developable ink".

The scratch color-developable ink (A) of this invention comprises an electron-donating colorless or light-color dye precursor (to be simply referred to as "dye precursor" hereinafter), an electron-accepting color developer (to be simply referred to as "color developer" hereinafter) and a varnish, characterized in that solid particle components contained therein have an average particle diameter of 0.3 to 25 μm. The "solid particle components" means components that are present as solid particles in the ink, such as the dye precursor, the color developer, an optional pigment, etc.

Further, the scratch color-developable ink (B) of this invention comprises the dye precursor, the color developer and a varnish, characterized in that an azaphthalide compound is used as the above dye precursor.

The dye precursor for use in the scratch color-developable ink of this invention is not specially limited so long as it is a substance that develops a color by means of an acid, while a crystalline dye precursor is preferred for preventing ink coloring caused by frictional contact, etc., during usual handling. For preventing the ink coloring during usual handling, it preferably has a higher melting point, and the melting point is preferably 160° C. or higher, more preferably 200° C. or higher, still more preferably 220° C. or higher. When the ink is colored, the printed portion of a printed sheet using the ink is also decreased in invisibility to the degree of coloring.

Specific examples of the dye precursor include:

(1) triarylmethane compounds such as 3,3-bis(p-dimethylaminophenyl)-6-dimethylaminophthalide (Crystal Violet Lactone), 3,3-bis(p-dimethylaminophenyl)-6-diethylaminophthalide (Ethyl Violet Lactone), 3,3-bis(p-dimethylaminophenyl)phthalide (Malachite Green Lactone), 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-bis(2-phenylindol-3-yl)-5-dimethylaminophthalide, 3-p-dimethylaminophenyl-3-(1-methylpyrrol-2-yl)-6-dimethylaminophthalide, etc., (2) diphenylmethane compounds such as 4,4'-bis(dimethylaminophenyl)benzhydrylbenzyl ether, N-chlorophenyl leucoauramine, N-2,4,5-trichlorophenyl leucoauramine, etc., (3) xanthene compounds such as rhodamine B anilinolactam, rhodamine B-p-chloroanilinolactam, 3-diethylamino-7-dibenzylaminofluorane, 3-diethylamino-7-octylaminofluorane, 3-diethylamino-7-phenylfluorane, 3-diethylamino-7-chlorofluorane, 3-diethylamino-6-chloro-7-methylfluorane, 3-diethylamino-7-(3,4-dichloroanilino)fluorane, 3-diethylamino-7-(2-chloroanilino)fluorane, 3-diethylamino-6-methyl-7-anilinofluorane, 3-dibutylamino-6-methyl-7-anilinofluorane, 3-dipentylamino-6-methyl-7-anilinofluorane, 3-(N-ethyl-N-tolyl)amino-6-methyl-7-anilinofluorane, 3-piperidino-6-methyl-7-anilinofluorane, 3-(N-ethyl-N-tolyl)amino-6-methyl-7-phenethylfluorane, 3-diethylamino-7-(4-nitroanilino) fluorane, 3-dibutylamino-6-methyl-7-anilinofluorane, 3-(N-methyl-N-propyl)amino-6-methyl-7-anilinofluorane, 3-(N-ethyl-N-isoamyl)amino-6-methyl-7-anilinofluorane, 3-(N-methyl-N-cyclohexyl)amino-6-methyl-7-anilinofluorane, 3-(N-ethyl-N-tetrahydrofurfuryl)amino-6-methyl-7-anilinofluorane, 3-diethylamino-6-chloro-7-anilinofluorane, etc., (4) thiazine compounds such as benzoyl leucomethylene blue, p-nitrobenzoyl leucomethylene blue, etc., and (5) spiro compounds such as 3-methylspirodinaphthopyran, 3-ethylspirodinaphthopyran, 3,3-dichlorospirodinaphthopyran, 3-benzylspirodinaphthopyran, 3-methylnaphtho-(3-methoxybenzo)spiropyran, 3-propylspirobenzopyran, etc., and at least one of these is employed.

When the discoloration prevention and color sensitivity of the scratch color-developable ink (A) are taken into account, it is preferred to use xanthene compounds.

The azaphthalide compound for use as a dye precursor in the scratch color-developable ink (B) of this invention is represented by the general formula (1).

[Chemical Formula (1)]

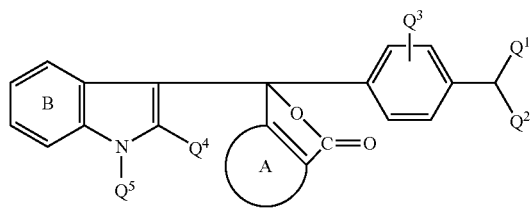

General Formula (1)

In the general formula (1), each of $Q^1$ and $Q^2$ is a hydrogen atom, a halogen atom, an alkyl group, an allyl group, a hydroxyl group, an alkoxy group or a cycloalkyl group. A carbon-carbon bond in $Q^1$ or $Q^2$ may have a divalent atom inserted therein. When each of $Q^1$ and $Q^2$ is an alkyl group or an alkoxy group, each may partly have a cyclized portion. Further, $Q^1$ and $Q^2$ may bond to each other forming a ring. $Q^3$ is a hydrogen atom, a halogen atom, an alkyl group, a nitro group, an allyl group, a hydroxyl group, a cyano group, an alkoxy group or a cycloalkyl group. A carbon-carbon bond in $Q^3$ may have a divalent atom inserted therein. When $Q^3$ is an alkyl group or an alkoxy group, it may partly have a cyclized portion. $Q^4$ is a hydrogen atom, a halogen atom, an alkyl group, an alkoxy group or a phenyl group, and $Q^5$ is a hydrogen atom, a halogen atom, an alkyl group, an alkoxy group or a phenyl group. A ring A is a nitrogen-containing aromatic ring, and a benzene ring B is a non-substituted benzene ring (substituents are only hydrogen atoms) or a benzene ring substituted with a halogen atom, a nitro group, an alkyl group, an alkoxy group or an alkylamino group. When the functional group represented by $Q^1$, $Q^2$, $Q^3$, $Q^4$ or $Q^5$ is a carbon(s)-containing group such as an alkyl group, the number of carbon atoms is at least 1 but not more than 8, and in view of invisibility, it is at least 1 but not more than 2. Further, the benzene ring B is preferably non-substituted in view of invisibility. The nitrogen-containing aromatic ring represented by the ring A is more preferably a pyridine ring in view of a shelf life.

Specific examples of the azaphthalide compound of the above general formula (1) are as follows. These may be used singly or in combination of two or more of them. In addition, the azaphthalide compound in this invention is not limited to the following specific examples.

3-(1-ethyl-2-methylindol-3-yl)-3-(2-ethoxy-4-aminophenyl)-4-azaphthalide, 3-(1-ethyl-2-methylindol-3-yl)-3-(2-ethoxy-4-methylaminophenyl)-4-azaphthalide, 3-(1-ethyl-2-methylindol-3-yl)-3-(2-ethoxy-4-ethylaminophenyl)-4-azaphthalide, 3-(1-ethyl-2-methylindol-3-yl)-3-(2-ethoxy-4-dimethylaminophenyl)-4-azaphthalide, 3-(1-ethyl-2-methylindol-3-yl)-3-(2-ethoxy-4-diethylaminophenyl)-4-azaphthalide,
3-(1-ethyl-2-methylindol-3-yl)-3-(2-ethoxy-4-dipropylaminophenyl)-4-azaphthalide, 3-(1-ethyl-2-methylindol-3-yl)-3-(2-ethoxy-4-dibutylaminophenyl)-4-azaphthalide, 3-(1-ethyl-2-methylindol-3-yl)-3-(2-ethoxy-4-dipentylaminophenyl)-4-azaphthalide, 3-(1-ethyl-2-methylindol-3-yl)-3-(2-ethoxy-4-dihexylaminophenyl)-4-azaphthalide, 3-(1-ethyl-2-methylindol-3-yl)-3-(2-ethoxy-4-dihydroxyaminophenyl)-4-azaphthalide, 3-(1-ethyl-2-methylindol-3-yl)-3-(2-ethoxy-4-dichloroaminophenyl)-4-azaphthalide, 3-(1-ethyl-2-methylindol-3-yl)-3-(2-ethoxy-4-dibromoaminophenyl)-4-azaphthalide, 3-(1-ethyl-2-methylindol-3-yl)-3-(2-ethoxy-4-diallylaminophenyl)-4-azaphthalide, 3-(1-ethyl-2-methylindol-3-yl)-3-(2-ethoxy-4-dihydroxyaminophenyl)-4-azaphthalide, 3-(1-ethyl-2-methylindol-3-yl)-3-(2-ethoxy-4-dimethoxyaminophenyl)-4-azaphthalide, 3-(1-ethyl-2-methylindol-3-yl)-3-(2-ethoxy-4-diethoxyaminophenyl)-4-azaphthalide, 3-(1-ethyl-2-methylindol-3-yl)-3-(2-ethoxy-4-dicyclohexylaminophenyl)-4-azaphthalide, 3-(1-ethyl-2-methylindol-3-yl)-3-(2-ethoxy-4-dimethylethoxyaminophenyl)-4-azaphthalide, 3-(1-ethyl-2-methylindol-3-yl)-3-(2-ethoxy-4-diethylethoxyaminophenyl)-4-azaphthalide, 3-(1-ethyl-2-methylindol-3-yl)-3-(2-ethoxy-4-diethylbutoxyaminophenyl)-4-azaphthalide, 3-(1-ethyl-2-methylindol-3-yl)-3-(2-ethoxy-4-dimethylcyclohexylaminophenyl)-4-azaphthalide, 3-(1-ethyl-2-methylindol-3-yl)-3-(2-ethoxy-4-dimethoxycyclohexylaminophenyl)-4-azaphthalide, 3-(1-ethyl-2-methylindol-3-yl)-3-(2-ethoxy-4-pyrrolidylaminophenyl)-4-azaphthalide, 3-(1-ethyl-2-methylindol-3-yl)-3-(3-ethoxy-4-diethylaminophenyl)-4-azaphthalide, 3-(1-ethyl-2-methylindol-3-yl)-3-(2,3-diethoxy-4-diethylaminophenyl)-4-azaphthalide, 3-(1-ethyl-2-methylindol-3-yl)-3-(4-diethylaminophenyl)-4-azaphthalide, 3-(1-ethyl-2-methylindol-3-yl)-3-(2-chloro-4-diethylaminophenyl)-4-azaphthalide, 3-(1-ethyl-2-methylindol-3-yl)-3-(2-bromo-4-diethylaminophenyl)-4-azaphthalide, 3-(1-ethyl-2-methylindol-3-yl)-3-(3-chloro-4-diethylaminophenyl)-4-azaphthalide, 3-(1-ethyl-2-methylindol-3-yl)-3-(3-bromo-4-diethylaminophenyl)-4-azaphthalide, 3-(1-ethyl-2-methylindol-3-yl)-3-(2-methyl-4-diethylaminophenyl)-4-azaphthalide, 3-(1-ethyl-2-methylindol-3-yl)-3-(2-ethyl-4-diethylaminophenyl)-4-azaphthalide, 3-(1-ethyl-2-methylindol-3-yl)-3-(2-propyl-4-diethylaminophenyl)-4-azaphthalide, 3-(1-ethyl-2-methylindol-3-yl)-3-(3-methyl-4-diethylaminophenyl)-4-azaphthalide, 3-(1-ethyl-2-methylindol-3-yl)-3-(2-nitro-4-diethylaminophenyl)-4-azaphthalide, 3-(1-ethyl-2-methylindol-3-yl)-3-(2-allyl-4-diethylaminophenyl)-4-azaphthalide, 3-(1-ethyl-2-methylindol-3-yl)-3-(2-hydroxy-4-diethylaminophenyl)-4-azaphthalide, 3-(1-ethyl-2-methylindol-3-yl)-3-(2-cyano-4-diethylaminophenyl)-4-azaphthalide, 3-(1-ethyl-2-methylindol-3-yl)-3-(2-cyclohexylethoxy-4-diethylaminophenyl)-4-azaphthalide, 3-(1-ethyl-2-methylindol-3-yl)-3-(2-methylethoxy-4-diethylaminophenyl)-4-azaphthalide, 3-(1-ethyl-2-methylindol-3-yl)-3-(2-cyclohexylethyl-4-diethylaminophenyl)-4-azaphthalide, 3-(2-ethylindol-3-yl)-3-(2-ethoxy-4-diethylaminophenyl)-4-azaphthalide, 3-(1-ethyl-2-chloroindol-3-yl)-3-(2-ethoxy-4-diethylaminophenyl)-4-azaphthalide, 3-(1-ethyl-2-bromoindol-3-yl)-3-(2-ethoxy-4-diethylaminophenyl)-4-azaphthalide, 3-(1-ethyl-2-ethylindol-3-yl)-3-(2-ethoxy-4- diethylaminophenyl)-4-azaphthalide, 3-(1-ethyl-2-propylindol-3-yl)-3-(2-ethoxy-4-diethylaminophenyl)-4-azaphthalide, 3-(1-ethyl-2-methoxyindol-3-yl)-3-(2-ethoxy-4-diethylaminophenyl)-4-azaphthalide, 3-(1-ethyl-2-ethoxyindol-3-yl)-3-(2-ethoxy-4-diethylaminophenyl)-4-azaphthalide, 3-(1-ethyl-2-phenylindol-3-yl)-3-(2-ethoxy-4-diethylaminophenyl)-4-azaphthalide, 3-(2-methylindol-3-yl)-3-(2-ethoxy-4-diethylaminophenyl)-4-azaphthalide, 3-(1-chloro-2-methylindol-3-yl)-3-(2-ethoxy-4-diethylaminophenyl)-4-azaphthalide, 3-(1-bromo-2-methylindol-3-yl)-3-(2-ethoxy-4-diethylaminophenyl)-4-azaphthalide, 3-(1-methyl-2-methylindol-3-yl)-3-(2-ethoxy-4-diethylaminophenyl)-4-azaphthalide, 3-(1-propyl-2-methylindol-3-yl)-3-(2-ethoxy-4-diethylaminophenyl)-4-azaphthalide, 3-(1-butyl-2-methylindol-3-yl)-3-(2-ethoxy-4-diethylaminophenyl)-4-azaphthalide, 3-(1-pentyl-2-methylindol-3-yl)-3-(2-ethoxy-4-diethylaminophenyl)-4-azaphthalide, 3-(1-hexyl-2-methylindol-3-yl)-3-(2-ethoxy-4-diethylaminophenyl)-4-azaphthalide, 3-(1-octyl-2-methylindol-3-yl)-3-(2-ethoxy-4-diethylaminophenyl)-4-azaphthalide, 3-(1-nonyl-2-methylindol-3-yl)-3-(2-ethoxy-4-diethylaminophenyl)-4-azaphthalide, 3-(1-methoxy-2-methylindol-3-yl)-3-(2-ethoxy-4-diethylaminophenyl)-4-azaphthalide, 3-(1-ethoxy-2-methylindol-3-yl)-3-(2-ethoxy-4-diethylaminophenyl)-4-azaphthalide, 3-(1-phenyl-2-methylindol-3-yl)-3-(2-ethoxy-4-diethylaminophenyl)-4-azaphthalide, 3-(1-ethyl-2-methylindol-3-yl)-3-(2-ethoxy-4-diethylaminophenyl)-7-azaphthalide, 3-(1-ethyl-2-methylindol-3-yl)-3-(2-ethoxy-4-diethylaminophenyl)-4,7-diazaphthalide, 3-(1-methyl-2-methylindol-3-yl)-3-(2-ethoxy-4-diethylaminophenyl)-7-azaphthalide, 3-(1-butyl-2-indol-3-yl)-3-(2-ethoxy-4-diethylaminophenyl)-7-azaphthalide, 3-(1-pentyl-2-methylindol-3-yl)-3-(2-ethoxy-4-diethylaminophenyl)-7-azaphthalide, 3-(1-hexyl-2-methylindol-3-yl)-3-(2-ethoxy-4-diethylaminophenyl)-7-azaphthalide, 3-(1-heptyl-2-methylindol-3-yl)-3-(2-ethoxy-4-diethylaminophenyl)-7-azaphthalide, 3-(1-octyl-2-methylindol-3-yl)-3-(2-ethoxy-4-diethylaminophenyl)-7-azaphthalide, 3-(1-nonyl-2-methylindol-3-yl)-3-(2-ethoxy-4-diethylaminophenyl)-7-azaphthalide, 3-(1-octyl-2-methylindol-3-yl)-3-(2-ethoxy-4-diethylaminophenyl)-4,7-diazaphthalide, 3-(1-ethyl-4,5,6,7-tetrachloro-2-methylindol-3-yl)-3-(2-ethoxy-4-diethylaminophenyl)-4-azaphthalide, 3-(1-ethyl-4-nitro-2-methylindol-3-yl)-3-(2-ethoxy-4-diethylaminophenyl)-4-azaphthalide, 3-(1-ethyl-4-methoxy-2-methylindol-3-yl)-3-(2-ethoxy-4-diethylaminophenyl)-4-azaphthalide, 3-(1-ethyl-4-methylamino-2-methylindol-3-yl)-3-(2-ethoxy-4-diethylaminophenyl)-4-azaphthalide, and 3-(1-ethyl-4-methyl-2-methylindol-3-yl)-3-(2-ethoxy-4-diethylaminophenyl)-4-azaphthalide.

The color developer for use in the scratch color-developable inks (A) and (B) of this invention is not specially limited so long as it is an acidic substance, and it can be at least one member selected, for example, from phenol derivatives, aromatic carboxylic acid derivatives, N,N'-diarylthiourea derivatives, arylsulfonylurea derivatives, sulfoneamide derivatives, polyvalent metal salts such as a zinc salt of an organic compound, benzensulfoneamide derivatives, etc.

For preventing the coloring of an ink caused by a frictional contact, etc., during usual handling, it is preferred to use a crystalline color developer. Further, it preferably has a high melting point as well for preventing the coloring of an ink caused by a frictional contact, etc., during usual handling. The melting point is preferably 140° C. or higher, more preferably 170° C. or higher, still more preferably 200° C. or higher.

When the ink is colored, the invisibility of a printed portion of a printed sheet using the ink is decreased to that extent.

Specific examples of the color developer include diphenyl sulfone compounds such as 4,4'-dihydroxydiphenyl sulfone, 2,4'-dihydroxydiphenyl sulfone, 4-hydroxy-4'-isopropoxydiphenyl sulfone, 4-hydroxy-4'-benzyloxydiphenyl sulfone, 4-hydroxy-4'-propoxydiphenyl sulfone, bis(3-allyl-4-hydroxydiphenyl) sulfone, 3,4-dihydroxy-4'-methyldiphenyl sulfone, 4-hydroxy-4'-methyldiphenyl sulfone, 4-hydroxy-4'-benzenesulfonyloxydiphenyl sulfone, 2,4-bis(phenylsulfonyl)phenol, etc.

Specific examples of others include p-phenyl phenol, p-hydroxyacetophenone, 1,1-bis(4-hydroxyphenyl)propane, 1,1-bis(4-hydroxyphenyl)pentane, 1,1-bis(4-hydroxyphenyl)hexane, 1,1-bis(4-hydroxyphenyl)cyclohexane, 2,2-bis(4-hydroxyphenyl) propane, 2,2-bis(4-hydroxyphenyl)hexane, 1,1-bis(4-hydroxyphenyl)-2-ethylhexane, 2,2-bis(3-chloro-4-hydroxyphenyl)propane, 1,3-di-[2-(4-hydroxyphenyl)-2-propyl]benzene, 1,3-di-[2-(3,4-dihydroxyphenyl)-2-propyl]benzene, 1,4-di-[2-(4-hydroxyphenyl)-2-propyl]benzene, 4,4'-hydroxydiphenyl ether, 3,3'-dichloro-4,4'-hydroxydiphenyl sulfide, methyl 2,2-bis(4-hydroxyphenyl)acetate, butyl 2,2-bis(4-hydroxyphenyl)acetate, 4,4'-thiobis(2-t-butyl-5-methylphenol), N-(2-hydroxyphenyl)benzene sulfoneamide, N-(2-hydroxyphenyl)-p-toluene sulfoneamide, N-(2,4-dihydroxyphenyl)benzene sulfoneamide, N-(2,4-hydroxyphenyl)-p-toluene sulfoneamide, N-(2-hydroxynaphthyl)benzene sulfoneamide, N-(2-hydroxynaphthyl)-p-toluene sulfoneamide, N-(2-hydroxyphenyl)-1-naphthalene sulfoneamide, N-(2-hydroxyphenyl)-2-naphthalene sulfoneamide, N-(2-hydroxynaphthyl)-1-naphthalene sulfoneamide, N-(2-hydroxynaphthyl)-2-naphthalene sulfoneamide, N-(2-hydroxyphenyl)-p-chlorobenzene sulfoneamide, N-(2-hydroxyphenyl)-p-methoxybenzene sulfoneamide, N-(2-hydroxyphenyl)-p-allylbenzene sulfoneamide, N-(2-hydroxyphenyl)-p-phenylbenzene sulfoneamide, 4,4'-bis(2-hydroxyphenylaminosulfonyl)diphenylmethane, N-(2-hydroxyphenyl)-N-methylbenzene sulfoneamide, N-(2-hydroxyphenyl)-N-methyl-p-toluene sulfoneamide, N-(2-hydroxyphenyl)-N-benzyl-p-toluene sulfoneamide, N-(2-hydroxyphenyl)-N-allyl-p-toluene sulfoneamide, N-(2-hydroxyphenyl)-N-phenylbenzene sulfoneamide, dimethyl 4-hydroxyphthalate, benzyl 4-hydroxybenzoate, methyl 4-hydroxybenzoate, benzyl gallate, steary gallate, N,N'-diphenylthiourea, 4,4'-bis(3-(4-methylphenylsulfonyl)ureido)diphenyl methane, N-(4-methylphenylsulfonyl)-N'-phenylurea, salicylanilide, 5-chlorosalicylanilide, salicylic acid, 3,5-di-tert-butylsalicylic acid, 3,5-di-α-methylbenzylsalicylic acid, 4-[2'-(4-methoxyphenoxy)ethyloxy]salicylic acid, 3-(octyloxycarbonylamino)salicylic acid, metal salts of these salicylic acid derivatives, N-(4-hydroxyphenyl)-p-toluenesulfoneamide, N-(4-hydroxyphenyl)-beznenesulfoneamide, N-(4-hydroxyphenyl)-1-naphthalenesulfoneamide, N-(4-hydroxyphenyl)-2-naphthalenesulfoneamide, N-(4-hydroxyphenyl)-p-toluenesulfoneamide, N-(4-hydroxyphenyl)benzenesulfoneamide, N-(4-hydroxynaphthyl)-1-naphthalenesulfoneamide, N-(4-hydroxynaphthyl)-2-naphthalenesulfoneamide, N-(3-hydroxyphenyl)-p-toluenesulfoneamide, N-(3-hydroxyphenyl)benzenesulfoneamide, N-(3-hydroxyphenyl)-1-naphthalenesulfoneamide, N-(3-hydroxyphenyl)-2-naphthalenesulfoneamide, etc. These can be used singly or in combination. In particular, when the prevention of discoloration or color sensitivity of the scratch color-developable ink is taken into consideration, it is preferred to use a diphenylsulfone compound. Further, when an azaphthalide compound is used as a dye precursor, the effect produced by preferably using a diphenylsulfone compound as a color developer becomes remarkable.

The varnish used in the scratch color-developable inks (A) and (B) contains a binder resin, and it contains an oil, a solvent, a dryer, etc., as required. The varnish can constitute a matrix component that constitutes a print layer, and it can be hence said that what remains after solid particle components are removed from the ink is the varnish.

In the present specification, a varnish that is contained in the scratch color-developable ink will be referred to as "varnish", and a varnish before the preparation of the scratch color-developable ink will be referred to as "varnish base".

The binder resin in the varnish includes natural resins such as rosin, natural resin derivatives such as hardened rosin, rosin ester, etc., and synthetic resins such as an alkyd resin, a polyamide resin, an acrylic resin, polyvinyl chloride, polyvinyl acetate, a styrene resin, an epoxy resin, a cellulose derivative, a phenolic resin, a rosin-modified phenolic resin, a xylene resin, a melamine resin, a urea resin, a ketone resin, a rosin-modified maleic resin, petroleum resins using unsaturated hydrocarbons such as olefins, dicyclopentadiene, etc., as raw materials, and these can be used singly or in combination. The acid value of the binder resin is preferably 0 to 30 mgKOH/g, more preferably 0 to 20 mgKOH/g. While some binder resins are not measurable for an acid value, such binder resins in the present specification shall be considered to have an acid value of 0 mgKOH/g. When the acid value of the binder resin is in the above range, the scratch color-developable ink and the invisible information printed sheet using the same are improved in invisibility.

For an acid value, the varnish base or the scratch color-developable ink can be measured as well, and it is preferred to adjust the acid value of the varnish base or the scratch color-developable ink on the basis of the measurement result so that a desired invisibility can be obtained.

The acid value of the varnish base is preferably 0 to 30 mgKOH/g, more preferably 0 to 20 mgKOH/g, still more preferably 0 to 12 mgKOH/g.

When the scratch color-developable ink is measured for an acid value, the color developer contained in the scratch color-developable ink also consumes KOH used for the acid value measurement. The acid value of the scratch color-developable ink can be therefore determined by deducting the amount of KOH consumed by the color developer from the obtained acid value.

The acid value of each of the scratch color-developable inks (A) and (B) is preferably 0 to 25 mgKOH/g, more preferably 0 to 18 mgKOH/g, still more preferably 0 to 10 mgKOH/g.

The amount of KOH consumed by the color developer can be determined by measuring an acid value of a sample prepared by incorporating a fixed amount of the color developer into the varnish base whose acid value measurement is already completed, and deducting the acid value of the varnish base from the thus-obtained acid value. As a simple method, there can be a method of determining a difference between the acid value of a sample only containing components that do not consume KOH and the acid value of another sample prepared by incorporating the color developer into the above sample.

The oil that the varnish can contain means a nonaqueous liquid that is nonvolatile at room temperature, and the solvent that the varnish can contain means a nonaqueous liquid that is volatile at room temperature. Of these, it is preferred not to use any solvent when safety, sanitary and environmental aspects are taken into consideration. When it is used, the content of the solvent in the scratch color-developable ink is preferably 30% by mass or less, more preferably 20% by mass or less, still more preferably 10% by mass or less. When the content of the solvent in the varnish contained in the scratch color-developable ink exceeds 30% by mass, it may have detrimental effects on safety, sanitary and environmental aspects.

The oil that can be contained in the varnish includes plant oils such as linseed oil, rape seed oil, coconut oil, olive oil, soybean oil, tung oil, etc., plant oils obtained by regenerating these, hydrogenated plant oils of these, and mineral oils such as spindle oil, machine oil, mobile oil, etc., and at least one of these can be employed. These oils are selected as required depending upon a use.

The solvent that can be contained in the varnish includes aromatic solvents such as toluene, xylene, etc., ester solvents such as ethyl acetate, isopropyl acetate, etc., ketone solvents such as acetone, methyl ethyl ketone, isobutyl ketone, alcohol solvents such as methyl alcohol, isopropyl alcohol, n-propyl alcohol, etc., aliphatic hydrocarbons such as n-hexane, n-heptane, cyclohexane, etc., glycol solvents such as ethylene glycol, diethylene glycol, etc., petroleum solvents containing paraffin or naphthene as a main component and having an aromatic component content of 1% or less, etc., and at least one of these can be used.

The dryer that can be contained in the varnish includes, for example, carboxylic acid metal salts such as cobalt naphthenate, manganese naphthenate, cobalt octylate, manganese octylate, etc., and at least one of these can be used. Specific examples of the metal that forms the above metal salts include cerium, copper, nickel, vanadium, chromium, calcium, aluminum, cadmium, zinc, tin, etc., in addition to the above cobalt and manganese.

The pigment that is preferably contained in the scratch color-developable inks (A) and (B) of this invention for adjusting glossiness or adjusting the scratch color-developing sensitivity and the scratch-developed color intensity can be selected from pigments that are generally used in various printing inks, coating compositions, coated paper, etc., while the pigment shall not be limited to these. For example, the pigment is preferably normally white since the support on which the scratch color-developable ink is printed is normally white. However, a colored pigment may be used depending upon the color of the support surface.

Specific examples of the pigment include inorganic pigments such as kaolin, diatomite, talc, calcined kaolin, light calcium carbonate, heavy calcium carbonate, precipitated calcium carbonate, magnesium carbonate, basic magnesium carbonate, zinc oxide, calcium sulfate, aluminum oxide, aluminum hydroxide, magnesium hydroxide, titanium dioxide, barium sulfate, zinc sulfate, amorphous silica, crystalline silicon dioxide, amorphous calcium silicate, colloidal silica, alumina, etc., and organic pigments such as a melamine resin filler, a urea-formalin resin filler, a polyethylene powder, a nylon powder, starch, etc., and at least one of these can be used. The Mohs hardness of the pigment is preferably 7 or less from the viewpoint of preventing the abrasion of a printing machine.

The scratch color-developable inks (A) and (B) may further contain various auxiliaries. For example, as a drying accelerator, there is preferably used a dryer that is selected from carboxylic acid metal salts such as cobalt naphthenate, manganese octylate, etc., which are discussed with regard to the above varnish. Further, there are used a chelating agent that is generally referred to as aluminum chelate, a modifier for adjusting the viscosity of the ink, such as a petroleum solvent, a wax for adjusting smoothness after printing, a surfactant, organic or inorganic fine particles, etc., as required. Further, fatty acid amides, an aliphatic urea compound, an ether compound, an esterified compound, a biphenyl derivative, etc., may be also used for increasing the intensity of a developed color. When the dryer is added, the setting of a printed portion becomes easy, and when a finger nail is used for scratching, the circumferential spreading of a color-developed portion is prevented or the occurrence of soiling is prevented, and more excellent effects tend to be produced.

When it is intended to decrease the glossiness of a printed surface, components of the ink can be adjusted to ensure that the ink increasingly infiltrates into a support on which the scratch color-developable ink is to be printed. One specific embodiment is that the viscosity of the ink is decreased by selecting a petroleum solvent, a varnish base, etc., and in particular, it is preferred to employ a method in which a dryer such as a drying accelerator that is a carboxylic acid metal slat is decreased in amount or not added in order to easily infiltrate the ink into a support.

When it is intended to increase the glossiness of a printed surface, components of the ink can be adjusted to ensure that the infiltration of the ink into a support is decreased. It is preferred to employ a method in which the viscosity of the ink is increased and the amount of a dryer to be added is increased so that the ink does not easily infiltrate into a support.

For keeping an invisible information printed portion from being visually recognized when the support on which the scratch color-developable ink is to be printed contains a fluorescent whitener, an ultraviolet absorbent, etc., it is preferred to incorporate a fluorescent whitener, an ultraviolet absorbent, etc., into the scratch color-developable ink. Further, an antioxidant may be also added as required.

The ultraviolet absorbent that is used as required includes benzotriazole derivatives, etc. Specific examples thereof include 2-(2-hydroxyphenyl)benzotriazole, 2-(2-hydroxy-5-methylphenyl)benzotriazole, 2-(2-hydroxy-5-tert-butylphenyl)benzotriazole, 2-(2-hydroxy-3,5-di-tert-butylphenyl)benzotriazole, 2-(2-hydroxy-3-tert-butyl-5-methylphenyl)-5-chlorobenzotriazole, 2-(2-hydroxy-3,5-di-tert-butylphenyl)-5-chlorobenzotriazole, 2-(2-hydroxy-3,5-di-t-aminophenyl)benzotriazole, 2-(2-hydroxy-3,5-di-tert-butylphenyl)-5-t-benzotriazole, 2-(2-hydroxy-3-dodecyl-5-methylphenyl)benzotriazole, 2-[2-hydroxy-4-(2-ethylhexyl)oxyphenyl]benzotriazole, a condensate of methyl-3-(3-tert-butyl-5-benzotriazolyl-4-hydroxyphenyl)propionate and polyethylene glycol (molecular weight approximately 300), octyl-5-tert-butyl-3-(5-chlorobenzotriazolyl)-4-hydroxy-benzene-propionate, 2-(2-hydroxy-3-sec-butyl-5-tert-butylphenyl)-5-tert-butylbenzotriazole, 2-(2-hydroxy-4-methoxy-5-sulfophenyl)benzotriazole sodium salt, 2-(2-hydroxy-4-butoxy-5-sulfophenyl)benzotriazole sodium salt, 2,2'-methylenebis(4-methyl-6-benzotriazolylphenol), 2,2'-methylenebis[4-methyl-6-(5-methylbenzotriazolyl)phenol], 2,2'-methylenebis[4-methyl-6-(5-chlorobenzotriazolyl)phenol], 2,2'-methylenebis[4-(1,1,3,3-tetramethylbutyl)-6-benzotriazolylphenol], 2,2'-methylenebis(4-tert-butyl-6-benzotriazolylphenol), 2,2'-propylidenebis(4-methyl-6-benzotriazolylphenol), 2,2'-isopropylidenebis(4-methyl-6-benzotriazolylphenol), 2,2'-isopropylidenebis[4-(1,1,3,3-tetramethylbutyl)-6-benzotriazolylphenol], 2,2'-octylidenebis(4-methyl-6-(methylbenzotriazolyl)phenol), etc.

Further, examples of the antioxidant that is used as required include hindered amines such as 1,1,3-tris(2-methyl-4-hydroxy-5-cyclohexylphenyl)butane, 1,1,3-tris(2-methyl-4-hydroxy-5-tert-butylphenyl)butane, 4,4'-butylienebis(6-tert-butyl-3-methylphenol), 1,1,2,2-tetrakis(5-cyclohexyl-4-hydroxy-2-methylphenyl)ethane, 1,1,2,2-tetrakis(3-phenyl-4-hydroxyphenyl)ethane, 1,1,2,2-tetrakis(3-tert-butyl-4-hydroxyphenyl)ethane, 1,1,3-tris(3-cyclohexyl-4-hydroxyphenyl)butane, 1,1,3-tris(3-cyclohexyl-4-hydroxy-5-methylphenyl)butane, 1,1,3-tris(3-phenyl-4-hydroxyphenyl)butane, 1,1,3-tris(5-phenyl-4-hydroxy-2-methylphenyl)butane, 1,1,3-tris(3-tert-butyl-4-hydroxyphenyl)butane, 1,1,3,3-tetrakis(5-cyclohexyl-4-hydroxy-2-methylphenyl)propane, 1,1,3,3-tetrakis(3-cyclohexyl-4-hydroxyphenyl)propane, 1,1,5,5-tetrakis(5-cyclohexyl-4-hydroxy-2-methylphenyl)pentane, 1,1,3,3-tetrakis(3-cyclohexyl-4-hydroxyphenyl)pentane, 1,1,3,3-tetrakis(3-phenyl-4-hydroxyphenyl)propane, 1,1,3,3-tetrakis(5-phenyl-4-hydroxy-2-methylphenyl)propane, 1,1,3,3-tetrakis(3-tert-butyl-4-hydroxyphenyl)propane, 1,1,3,3-tetrakis(5-tert-butyl-4-hydroxy-2-methylphenyl)propane, 2,2-methylenebis(4-methyl-6-tert-butylphenol), 2,2'-methylenebis(4-ethyl-6-tert-butylphenol), 2,2'-ethylidenebis(4,6-di-tert-butylphenol), 4,4'-thiobis(3-methyl-6-tert-butylphenol), 4,4'-thiobis(2-methyl-6-tert-butylphenol), 4,4'-thiobis(2-methylphenol), 4,4'-thiobis(2,6-dimethylphenol), 4,4'-thiobis(2,6-di-tert-butylphenol), 2,2'-thiobis(4-t-octylphenol), 2,2'-thiobis(3-t-octylphenol), 1-[α-methyl-α-(4'-hydroxyphenyl)ethyl]-4-[α',α'-bis(4"-hydroxyphenyl)ethyl]benzene, 2,2-bis(4-hydroxy-3,5-dibromophenyl)propane, 2,2-bis(4-hydroxy-3,5-dimethylphenyl)propane, tris(2,6-dimethyl)-4-terb-butyl-3-hydroxybenzyl)iscyanurate, etc.

In the scratch color-developable ink (A) of this invention, the average particle diameter of the solid particle component in the ink is 0.3 to 25 μm, preferably 0.8 to 20 μm, more preferably 1 to 10 μm. The above average particle diameter refers to a particle diameter that corresponds to a cumulative value of 50% in a size distribution based on the particle frequency of primary and/or secondary particles. A typical measuring apparatus is a Microtrack apparatus.

When the solid particle component has an average particle diameter of 0.3 μm or more, it is preferred for preventing the coloring of the ink caused by frictional contact during usual handling. When the average particle diameter of the solid particle component is greater than 25 μm, a printed portion may be roughened or the invisibility may decrease.

In the present specification, the average particle diameter means a volume average particle diameter unless otherwise specified, and the above average particle diameter is measurable with a particle size distribution measuring apparatus, etc.

The average particle diameter of the dye precursor and/or the color developer is preferably 0.3 μm or more, more preferably 0.8 μm or more, still more preferably 1 μm or more, yet more preferably 1.4 μm or more, particularly preferably 2.0 μm or more. When the dye precursor and/or the color developer have/has an average particle diameter of 0.3 μm or more, it is preferred for preventing the coloring of the ink caused by frictional contact during usual handling. The average particle diameter of the dye precursor and/or the color developer is preferably 25 μm or less, more preferably 20 μm or less, still more preferably 10 μm or less, particularly preferably 5.0 μm or less. When the dye precursor and the color developer have an average particle diameter of 25 μm or less, it is preferred for obtaining the invisibility of a printed portion. When the average particle diameter is large than 25 μm, a printed portion may be roughened or the invisibility may decrease.

The dye precursor and/or the color developer are/is preferably milled or granulated so as to have a desired average particle diameter before the production of the scratch color-developable ink, while they may be milled during the production of the scratch color-developable ink so as to have a desired particle diameter. Alternatively, the dye precursor and/or the color developer may be milled or granulated until they have an average particle diameter a little larger than a desired average particle diameter before the production of the scratch color-developable ink and then milled so as to have the desired average particle diameter during the production of the scratch color-developable ink.

The average particle diameter of the pigment can be selected as required by taking account of its balance with the glossiness of a support on which the scratch color-developable ink is printed, and the average particle diameter thereof is preferably 0.015 to 5 µm, more preferably 0.02 to 5 µm, still more preferably 0.3 to 1.5 µm. When the above average particle diameter exceeds 5 µm, an ink-printed surface has a roughened appearance and sometimes the invisibility is not obtained (visually recognizable). A pigment having an average particle diameter of less than 0.015 µm is not easily available.

When it is intended to decrease the glossiness of the ink, the intention can be attained by adding a pigment having a large average particle diameter to the ink or by increase the content of the pigment. When it is intended to increase the glossiness, the intention can be attained by decreasing the average particle diameter of a pigment to decrease the content thereof, or by incorporating no pigment.

In the scratch color-developable ink (B) of this invention, further, the preferred average particle diameter of the solid particle component, the preferred average particle diameter of the dye precursor and/or the color developer and the preferred average particle diameter of the pigment in the scratch color-developable ink (A) also constitute preferred embodiments for the same reasons as those in the scratch color-developable ink (A).

The average particle diameter is also similarly defined. However, even when the average particle diameter each in the scratch color-developable ink (B) is outside the preferred range, it may less affect its practical use.

With regard to the particle diameter of the solid particle component, it is preferred to take account of the number of existing coarse particles having a diameter of 30 µm or more in addition to the above average particle diameter. That is, the number of coarse particles having a particle diameter of 30 µm or more in 1 g of the scratch color-developable ink is preferably 30,000 pieces or less, more preferably 10,000 pieces or less, still more preferably 1,000 pieces or less, particularly preferably 100 pieces or less. When the number of coarse particles having a diameter of 30 µm or more exceeds 30,000 pieces, the surface of a printed portion obtained by solid-printing with the scratch color-developable ink has a poor appearance, and the invisible information may be read. In addition, 30,000 pieces of particles in 1 g of the ink may appear to be large, but when a case where the amount of the ink printed per square meter is 1 g is taken for example, it means 30,000 pieces per square meter of a printed portion, and it means 3 pieces per square centimeter. Even if the amount of the ink should be larger than 1 g per square meter, the risk of information being read considerably decreases so long as the number of the coarse particles in 1 g of the scratch color-developable ink is 30,000 pieces or less. Therefore, the area of solid printing can be increased.

Whichever they are, primary particles or secondary particles, particles under the above particle condition (30 µm or more) are coarse particles In the scratch color-developable ink (A) of this invention, when soiling and the color development of a printed portion are taken into account, the content ratio of the dye precursor and the color developer by mass is preferably 1:0.5 to 1:5, more preferably 1:1 to 1:4.

The above preferred number of existing coarse particles or the above preferred content ratio of the dye precursor and the color developer in the scratch color-developable ink (A) are also preferred embodiments in the scratch color-developable ink (B) for the same reasons.

Although the content of the varnish in the scratch color-developable ink differs depending upon printing methods, the content of the varnish based on the scratch color-developable ink is preferably 10 to 90% by mass, more preferably 20 to 85% by mass, still more preferably 30 to 85% by mass, particularly preferably 60 to 85% by mass. When the content of the varnish is smaller than 10% by weight, various printing failures (soiling during printing, etc.) are liable to take place. When it is larger than 90% by mass, the density of a color developed by scratching may be possibly decreased.

In the above range, a large amount of the varnish can be sometimes contained in the scratch color-developable ink, and such a large content of the varnish has been considered disadvantageous for color development due to the interspersion of the dye precursor and the color developer in the varnish. According to studies made by the present inventors, however, it has been found that excellent coloring sensitivity and color density can be unexpectedly obtained.

The range of content of the pigment is determined from the viewpoint of a developed color density, and the content thereof based on the dye precursor is preferably 400% by mass or less, more preferably 200% by mass or less, still more preferably 100% by mass or less. When the content of the pigment based on the dye precursor exceeds 400% by mass, the developed color density may be decreased.

The method of producing the scratch color-developable ink of this invention will be explained below.

Although not specially limited, the method of producing the scratch color-developable ink is preferably a method in which the dye precursor and/or the color developer are/is kneaded in a varnish base (including a vehicle (excipient) containing a varnish base, and used in this sense hereinafter) to allow the dye precursor and the color developer in the form of particles to be contained in the varnish base. The varnish base containing at least one of the dye precursor, the color developer and the pigment will be referred to as "ink base" hereinafter.

When predetermined amounts of the dye precursor and the color developer are simultaneously added to the varnish base and kneaded, the dye precursor may be caused to develop a color to cause the coloring of the ink. It is hence preferred to employ a method in which they are kneaded separately to form ink bases and then predetermined amounts of the ink bases are fully mixed with a stirrer, etc., for the invisualization of a printed portion, since the coloring of the ink by a contact, etc., of the dye precursor and the color developer can be decreased.

Like the dye precursor and the color developer, the pigment is also preferably kneaded in a varnish base to incorporate it in the form of solid particles in the varnish base. In this case, the pigment alone may be kneaded in the varnish base to obtain an ink base containing the pigment, or it may be kneaded together with the dye precursor or the color developer to obtain an ink base. When the ink base is obtained by kneading the pigment together with the dye precursor or the color developer, a pigment-containing ink base obtained by kneading a pigment alone may be further added during the production of an ink.

When the three components of the dye precursor, the color developer and the pigment are focused on, classifications and combinations of/for the ink base will be as follows. Symbols a, b and c at the end of ink base represent effective components, and a=dye precursor, b=color developer and c=pigment.

Ink base (ab) containing dye precursor and color developer.
Ink base (abc) containing dye precursor, color developer and pigment.
Ink base (a) containing dye precursor.
Ink base (ac) containing dye precursor and pigment.
Ink base (b) containing color developer.
Ink base (bc) containing color developer and pigment.
Ink base (c) containing pigment.

When the scratch color-developable ink is produced, the above seven ink bases can be combined as required, while the number of the ink bases is preferably 3 or less for reducing the steps of producing the ink base. Typical examples of a combination thereof are as follows.

(1) Ink base (ab) alone or ink base (abc) alone.
(2) A combination of ink base (ab) with ink base (c), or a combination of ink base (abc) with ink base (c).
(3) A combination of ink base (a) with ink base (b).
(4) A combination of ink base (a), ink base (b) and ink base (c).
(5) A combination of ink base (ac) with ink base (b).
(6) A combination of ink base (a) with ink base (bc).
(7) A combination of ink base (ac) with ink base (bc).
(8) A combination of ink base (ac), ink base (b) and ink base (c).
(9) A combination of ink base (a), ink base (bc) and ink base (c).
(10) A combination of ink base (ac), ink base (bc) and ink base (c).

In addition to the above combinations (a) to (10), four or more ink bases may be combined as required. In the largest case, all of the above seven ink bases may be combined. Two or more ink bases represented by one indication (e.g., two ink bases (ab)) may be combined, while it is preferred to use one ink base to combine it with other ink base(s) for reducing the steps of producing ink bases. With regard to the ink base (c), it is sometimes advantageous to combine two ink bases (c) since an ink base for other generally usable printing ink can be used or is sometimes used instead.

Other main combinations that can be selected in this invention will be described below.

(11) A combination of ink base (ab) with ink base (a).
(12) A combination of ink base (ab) with ink base (b).
(13) A combination of ink base (ab), ink base (a) and ink base (b).
(14) A combination of ink base (ab), ink base (a) and ink base (c).
(15) A combination of ink base (ab), ink base (b) and ink base (c).
(16) A combination of ink base (ab), ink base (a), ink base (b) and ink base (c).

Alternatively, there are also further combinations obtained by combining each of the combinations (11) to (16) with one or two or more of ink base (abc), ink base (ac), ink base (bc) and ink base (c).

The varnish in the scratch color-developable ink of this invention can be obtained by a conventionally known method. For example, it can be obtained by melting a component such as a binder resin, an oil, etc., and then adding a solvent, an aluminum chelating agent, etc., as required to allow them to react.

The invisible information printed sheet of this invention will be explained below.

The invisible information printed sheet of this invention comprises the scratch color-developable ink of this invention, invisible information and a support, the invisible information being printed on the support with the scratch color-developable ink.

As the support for use in the invisible information printed sheet of this invention, paper (including a paper board) is mainly used. Besides paper, the support can be selected from various woven fabrics, nonwoven fabrics, synthetic resin films, synthetic resin laminated papers, synthetic papers, metal foils, vapor deposition sheets, or composite sheets obtained by combining these by laminating, etc., as required depending upon purposes. The support may contain a fluorescent whitener, an ultraviolet absorbent, an antioxidant, etc., as required, and the ultraviolet absorbent and the antioxidant include those that may be incorporated into the above scratch color-developable ink as required.

The thickness of the support is not specially limited. From the viewpoint of easiness in handling such as freedom from wrinkles when it is scratched, a basis weight of 40 g/m$^2$ or more is preferred, a basis weight of 80 g/m$^2$ or more is more preferred, and a basis weight of 120 g/m$^2$ or more is still more preferred. When it is required to prevent its bending in particular, a basis weight of 200 g/m$^2$ or more is particularly preferred.

Further, for keeping invisible information from being read through, the visible light transmittance of the support is preferably 20% or less, more preferably 10% or less, still more preferably 5% or less. The visible light transmittance can be determined on the basis of opacity (%) determined by measurement according to ISO 2470. That is, the visible light transmittance (%) is a value obtained by deducting opacity (%) from 100.

Further, as means of preventing it from being read through, pattern printing is effective, and when the support is a paper support, watermarking is also effective, and these means are employed as required.

Further, the support may be provided with a layer suitable for a use that an ordinary support is intended for, such as an inkjet ink receiving layer suitable for inkjet recording, a sticking layer, etc. Such a layer and a portion on which the scratch color-developable ink is to be printed may overlap each other, or when the scratch color-developable ink is printed on one surface, such a layer may be formed on the same surface or the opposite surface, or such layers may be formed on both the surfaces.

In particular, it is preferred to use a support having a coating layer containing a pigment and a binder on its surface which is to be provided with invisible information, since the surface is excellent in artistic beauty and transparency, is improved in scratchability (easiness in scratching) and color developability by scratching (coloring sensitivity) and is also improved in soiling of developed color during handling. The pigment includes inorganic pigments such as kaolin, diatomite, talc, calcined kaolin, light calcium carbonate, heavy calcium carbonate, precipitated calcium carbonate, magnesium carbonate, zinc oxide, aluminum oxide, aluminum hydroxide, magnesium hydroxide, titanium dioxide, barium sulfate, zinc sulfate, amorphous silica, amorphous calcium silicate, colloidal silica, alumina, etc., and organic pigments such as a melamine resin filler, a urea-formalin resin filler, a polyethylene powder, a nylon powder, starch, etc., and at least one of these can be used. Generally, a white pigment is used, and an organic pigment may be also used.

The binder in the coating layer includes water-soluble binders such as starches, hydroxymethyl cellulose, methyl cellulose, carboxymethyl cellulose, gelatin, casein, polyvinyl alcohol, denatured polyvinyl alcohol, sodium alginate, polyvinyl pyrrolidone, polyacrylamide, an acrylamide/acrylate ester copolymer, an acrylamide/acrylate ester/methacrylate terpolymer, an alkali salt of a polyacrylic acid, an alkali salt of a polymaleic acid, an alkali salt of a styrene/maleic anhydride copolymer, an alkali salt of an ethylene/maleic anhydride copolymer, an alkali salt of an isobutylene/maleic anhydride copolymer, etc., and water-dispersible binders such as a styrene/butadiene copolymer, an acrylonitrile/butadiene copolymer, an methyl acrylate/butadiene copolymer, an acrylonitrile/butadiene/styrene terpolymer, polyvinyl acetate, a vinyl acetate/acrylate ester copolymer, an ethylene/vinyl acetate copolymer, a polyacrylic ester, a styrene/acrylate ester copolymer, polyurethane, etc., and at least one of these can be used.

Concerning the method of adjusting the glossiness of the support, for example, when it is intended to decrease the glossiness, it is accomplished by using a pigment having a large average particle diameter in the coating layer or increasing the content of the pigment. However, when the average particle diameter of the pigment is too large, the surface formed by printing the scratch color-developable ink is also coarse and printed information is liable to be unclear. When it is intended to increase the glossiness, it is accomplished by decreasing the average particle diameter of the pigment, while it is difficult to obtain those which have an extremely small average particle diameter. The average particle diameter of the pigment is preferably 0.02 to 5 μm, more preferably 0.3 to 4 μm.

When the pigment content is large and when the binder content is too small, the strength decreases, and the problem of a powder falling off is liable to take place. Therefore, the content of the binder as a solid based on the pigment is preferably 10 to 500% by mass, more preferably 10 to 100% by mass. In view of the problem of a powder falling off, etc., the coating amount as a solid is preferably 30 g/m$^2$ or less, particularly preferably 2 to 20 g/m$^2$. When the coating layer of the support is surface-treated, the glossiness is adjusted based on treatment conditions of a super calender, a soft calender, etc. When the coating layer is not provided, the point is what support is to be selected.

In the invisible information printed sheet of this invention, for making it more difficult to discriminate an invisible information printed portion of the scratch color-developable ink in the support surface, the ink film thickness in the printed portion is preferably adjusted to 2.0 μm or less, more preferably, to 1.4 μm or less, still more preferably, to 1.0 μm or less, particularly preferably, to 0.8 μm or less. When the thickness of the scratch color-developable ink exceeds 2.0 μm, the ink printed portion tends to gradually increase a color density from a light color and hence gradually exhibits a contrast to the support surface, and the invisibility tends to be impaired. It has been also found for the first time in the study of the present invention that when the above ink film thickness exceeds 2.0 μm, the color development by scratching may require a strong force (the coloring sensitivity may decrease). For obtaining the developed color intensity, the ink film thickness is preferably 0.3 μm or more, more preferably 0.4 μm or more.

The ink film thickness can be determined by directly measuring a thickness of a scratch color-developable ink printed portion on the sheet, while it can be also determined by preparing a solid printed matter (The printed mater will be also sometimes referred to as "printability-evaluating specimen" hereinafter) of an ink to be evaluated, in a sheet preparation stage, measuring a solid printed area A and a transferred ink volume B and calculating B/A. For preparing a printability-evaluating specimen, there can be used a printing machine (to be referred to as "printability-evaluating tester" hereinafter) having an ink-kneading mechanism composed of a metal roller and a rubber roller, which is made after the ink feed mechanism of an RI tester or an offset printing machine. The amount of an ink to be fed to the above printability-evaluating tester can be measured by using an ink pipette capable of accurate measurement, or the like. With regard to a ratio of the ink transfer from the printability-evaluating tester to a substrate, generally, a plurality of printability-evaluating specimens are prepared and an average value of transferred ink masses is determined beforehand by measuring them.

When it is difficult to measure a thickness of a scratch color-developable ink printed portion of the invisible information printed sheet, the content of the dye per unit area may be defined in place of the ink film thickness or together with the ink film thickness. The content of the dye per unit area is preferably 0.02 to 0.30 g/m$^2$, more preferably 0.05 to 0.20 g/m$^2$, still more preferably 0.06 to 0.15 g/m$^2$.

In the invisible information printed sheet of this invention, the ratio of glossiness of a printed portion to the glossiness of a non-printed portion on the support surface, as a 60-degree specular glossiness ratio according to JIS-K5701-1, is preferably 65% to 150%, more preferably 75% to 140%. Further, the ratio of glossiness of a printed portion to the glossiness of a non-printed portion on the support surface, as a 75-degree specular glossiness ratio according to JIS-K5701-1, is preferably 45% to 105% more preferably 48% to 103%.

When the glossiness ratios are brought into the above ranges, an invisible information printed portion of the scratch color-developable ink on the support surface is more difficult to discriminate. The glossiness ratio is determined on the basis of the following expression 1.

Glossiness ratio=(glossiness on the scratch printed surface/glossiness of support)×100 (Expression 1)

The method of producing the invisible information printed sheet of this invention will be explained below.

When printing is made in the scratch portion (invisible information printed portion and its entire circumferential region) and a region surrounding it, various printing inks can be used in addition to the scratch color-developable ink, and inks having a hue different from the color-developed hue of the scratch color-developable ink the hue of the support surface can be also used. When the hue of the support surface is white, and when the color-developed hue of the scratch color-developable ink is black or blue, inks having a high brightness such as yellow, orange, etc., are preferred. In the following explanation, the 60-degree (or 75-degree specular glossiness ratio represents a glossiness ratio of a scratch non-printed portion of the scratch portion and a scratch color-developable printed portion.

For printing with the scratch color-developable ink or various printing inks that are used as required, various printing methods such as offset printing, gravure printing, letterpress printing, etc., are used, while the printing with various printing inks is preferably practiced in the step of printing with the scratch color-developable ink, since it is efficient. The order of printings is not specially limited. When invisible information is printed with the scratch color-developable ink after printing is made on the scratch portion and its circumferential region with various printing inks, the color developability (scratch color sensitivity) becomes excellent. When the invisible information is printed first, there can be obtained an effect that various printing inks protect the invisible information (this does not mean an optical concealment, but means the effect of physical protections from chemical influences by water, fats and oils derived from human bodies, air, etc.).

In the invisible information printed sheet of this invention, it is difficult or impossible to discriminate where the scratch portion including the invisible information printed portion exists on the sheet. It is hence preferred to provide a border, a mark or a pattern that indicates the scratch portion by printing with various printing inks as required.

When only one surface of the invisible information printed sheet has the scratch portion and is taken as a front surface, it is preferred to print an indicator that is capable of being indicative of the front or a reverse, beforehand with various printing inks as required.

The invisible information printed sheet may have invisible information printed on each surface. Such pieces of information (e.g., winning or losing information when it is used in the draw of lots, etc.) may be the same or different depending upon a design.

When invisible information for the invisible information printed sheet of this invention is printed, it is printed with the scratch color-developable ink of this invention by various printing methods such as offset printing, letterpress printing, etc., while it is particularly preferred to employ offset printing in view of printing accuracy and printing qualities. Further, two or more inks different in developed color hue or color intensity may be used for making invisible information of multiple color or tone.

The invisible information printed sheet of this invention is almost free from a visibility decrease caused by water, fats and oils, humidity, heat, etc., and has durability for use after stored for a long period of time. On the other hand, although it has no particular problem to general illuminations (a fluorescent light, etc.), while the invisibility may be slightly decreased due to the yellowing of an invisible information printed portion when it is handled like it is exposed to sunlight containing ultraviolet light for a long period of time. It is hence preferred to print a proper pattern or print solid with a dummy ink that is an ink obtained by excluding one of the dye precursor or the color developer from the scratch color-developable ink. The dummy ink can be prepared in the same manner as in the production of the scratch color-developable ink except that one of the dye precursor or the color developer is excluded. The yellowing of the scratch color-developable ink by sunlight and the yellowing of the dummy ink by sunlight are almost similar under the same conditions, so that the invisible information that is recognized for the first time by scratch color development is not recognizable even if a portion of the yellowing is visually recognized. The invisible information printed may sometimes undergo discoloration by sunlight besides yellowing depending upon a component contained in the scratch color-developable ink. In this case, the color of the dummy ink is changed or adjusted when it is discolored, whereby a similar effect can be obtained.

The invisible information printed sheet of this invention requires a considerably high temperature when an attempt is made to develop the color of it thermally, so that there is some doubt about an explanation of the color development based on only the frictional heat caused during scratching.

On the other hand, with regard to an invisible information printed sheet to which a pressure-sensitive copying paper is applied, it has been explained that the color development mechanism thereof is based on a pressure. In the invisible information printed sheet of this invention, however, it is difficult to develop a color by a writing pressure or a strong pressure applied from above the sheet, but invisible information can be visualized easily in high developed-color intensity by scratching it with a finger nail. It is therefore difficult to explain the color development mechanism of the invisible information printed sheet of this invention from the aspect of a pressure alone, and it has a possibility of its color development mechanism being different from the counterpart of conventional invisible information printed sheets.

EXAMPLES

This invention will be explained in detail hereinafter, while this invention shall not be limited by these Examples. In Examples, "part" and "%" stand for "part by mass" and "% by mass" unless otherwise specified.

In Examples and Comparative Examples below, an average particle diameter, an acid value, the number of coarse particles in a scratch color-developable ink, an ink film thickness and glossiness of an invisible information printed sheet and a visible light transmittance of a support were measured by the following method.

<Average Particle Diameter>

A scratch color-developable ink or ink base was diluted with an oil that was the same as an oil used in the scratch color-developable ink production to be described later, and it was added to a low-viscosity saturated hydrocarbon to prepare a measurement sample. Each average particle diameter was measured with a laser scattering/diffraction particle size distribution analyzer Microtrac HRA (supplied by NIKKISO CO., LTD.). A solution to be measured was ultrasonically treated before the measurement.

<Acid Value>

Measured according to JISK5601-2-1.

The acid value of a scratch color-developable ink was determined by deducting a KOH amount consumed by a color developer from an acid value obtained.

<Number of Coarse Particles>

A constant amount of a scratch color-developable ink was applied onto a support to form a film thickness of 20 μm, then, an enlarged photograph of an applied portion was taken through an optical microscope, and particles having a major diameter of 30 μm or more within a constant area were counted.

The number of coarse particles per gram of the scratch color-developable ink was determined on the basis of the number of the coarse particles within the above constant area and an application area per gram of the scratch color-developable ink.

<Ink Film Thickness>

A solid printed matter of an ink to be evaluated was prepared, it was measured for a solid printed area A and a transferred ink volume B, and an ink film thickness was calculated by B/A. A printability-evaluating tester was used for the preparation of the above solid printed matter. Further, for determining the transfer ink volume B, the ink to be supplied to the printability-evaluating tester was measured for an amount with an ink pipette capable of accurate measurement, a plurality of solid printed matters or printability-evaluating specimens were prepared beforehand, an average value of transferred ink masses was determined, and this was used as an ink transfer ratio from the printability-evaluating tester and a substrate.

<Glossiness>

Measured with a Handy Grossmeter PG-1 supplied by Nippon Denshoku Industries Co., Ltd. according to JIS-K5701-1.

<Visible Light Transmittance>

An opacity (%) was measured with an instrument for control of color differences in white paper and board supplied by Nippon Denshoku Industries, Co., Ltd. according to ISO 2470, and the thus-obtained value was deducted from 100 to obtain a visible light transmittance.

Preparation Examples of a varnish base and ink bases will be described first.

(Preparation of Varnish Base)

50 Parts by mass of a rosin-modified phenolic resin (mass average molecular weight 60000, acid value 20 mgKOH/g) as a binder resin, 20 parts by mass of linseed oil that was a plant oil and 20 parts by mass of spindle oil are mixed and heated at approximately 200° C. for approximately 1 hour to dissolve the resin. Then, 10 parts by mass of spindle oil and 1 part by mass of an aluminum chelating agent were further added, and the mixture was heated at approximately 180° C. for approximately 1 hour to give a varnish base. Varnish bases used in Examples and Comparative Examples hereinafter were obtained by the above method unless otherwise specified. The thus-obtained varnish base was measured for an acid value to show 12 mgKOH/g.

(Preparation of Ink Base (a-1))

50 Parts by mass of the above varnish base, 30 parts by mass of 3-diethylamino-6-methyl-7-anilinofluorane as a dye precursor and 5 parts by mass of spindle oil were kneaded with a three-roll mill until the dye precursor had an average particle diameter of 2.0 µm. Further, 10 parts by mass of the above varnish base and 5 parts by mass of spindle oil were added to prepare an ink base (a-1).

(Preparation of Ink Base (a-2))

An ink base (a-2) was prepared in the same manner as in the preparation of the ink base (a-1) except that 30 parts by mass of 3-dibutylamino-6-methyl-7-anilinofluorane was used as a dye precursor in place of 30 parts by mass of 3-diethylamino-6-methyl-7-anilinofluorane.

(Preparation of Ink Base (a-3))

An ink base (a-3) was prepared in the same manner as in the preparation of the ink base (a-1) except that 30 parts by mass of crystal violet lactone was used as a dye precursor in place of 30 parts by mass of 3-diethylamino-6-methyl-7-anilinofluorane.

(Preparation of Ink Base (a-4))

An ink base (a-4) was prepared in the same manner as in the preparation of the ink base (a-1) except that 30 parts by mass of 3-diethylamino-6-chloro-anilinofluorane was used as a dye precursor in place of 30 parts by mass of 3-diethylamino-6-methyl-7-anilinofluorane.

(Preparation of Ink Base (ac-1))

50 Parts by mass of the above varnish base, 20 parts by mass of 3-diethylamino-6-methyl-7-anilinofluorane as a dye precursor, 10 parts by mass of aluminum hydroxide (average particle diameter 0.3 µm) as a pigment and 5 parts by mass of spindle oil were kneaded with a three-roll mill until the dye precursor had an average particle diameter of 2.0 µm. Further, 10 parts by mass of the above varnish base and 5 parts by mass of spindle oil were added to prepare an ink base (ac-1).

(Preparation of Ink Base (ac-2))

An ink base (ac-2) was prepared in the same manner as in the preparation of the ink base (ac-1) except that 20 parts by mass of 3-dibutylamino-6-methyl-7-anilinofluorane was used as a dye precursor in place of 20 parts by mass of 3-diethylamino-6-methyl-7-anilinofluorane.

(Preparation of Ink Base (ac-3))

An ink base (ac-3) was prepared in the same manner as in the preparation of the ink base (ac-1) except that 20 parts by mass of crystal violet lactone was used as a dye precursor in place of 20 parts by mass of 3-diethylamino-6-methyl-7-anilinofluorane.

(Preparation of Ink Base (ac-4))

50 Parts by mass of the above varnish base, 20 parts by mass of 3-diethylamino-6-methyl-7-anilinofluorane as a dye precursor, 10 parts by mass of light calcium carbonate (average particle diameter 1.0 µm) as a pigment and 5 parts by mass of spindle oil were kneaded with a three-roll mill until the dye precursor had an average particle diameter of 2.0 µm. Further, 10 parts by mass of the above varnish base and 5 parts by mass of spindle oil were added to prepare an ink base (ac-4).

(Preparation of Ink Base (ac-5))

An ink base (ac-5) was prepared in the same manner as in the preparation of the ink base (ac-4) except that 20 parts by mass of 3-dibutylamino-6-methyl-7-anilinofluorane was used as a dye precursor in place of 20 parts by mass of 3-diethylamino-6-methyl-7-anilinofluorane.

(Preparation of Ink Base (ac-6))

An ink base (ac-5) was prepared in the same manner as in the preparation of the ink base (ac-4) except that 20 parts by mass of crystal violet lactone was used as a dye precursor in place of 20 parts by mass of 3-diethylamino-6-methyl-7-anilinofluorane.

(Preparation of Ink Base (b-1))

50 Parts by mass of the above varnish base, 30 parts by mass of 4-hydroxy-4'-isopropoxydiphenyl sulfone as a color developer and 5 parts by mass of spindle oil were kneaded with a three-roll mill until the color developer had an average particle diameter of 2.0 µm. Further, 10 parts by mass of the above varnish base and 5 parts by mass of spindle oil were added to prepare an ink base (b-1).

(Preparation of Ink Base (b-2))

An ink base (b-2) was prepared in the same manner as in the preparation of the ink base (b-1) except that 30 parts by mass of 2,4'-dihydroxydiphenyl sulfone was used as a color developer in place of 30 parts by mass of 4-hydroxy-4'-isopropoxydiphenyl sulfone.

(Preparation of Ink Base (b-3))

An ink base (b-3) was prepared in the same manner as in the preparation of the ink base (b-1) except that 30 parts by mass of 4,4'-dihydroxydiphenyl sulfone was used as a color developer in place of 30 parts by mass of 4-hydroxy-4'-isopropoxydiphenyl sulfone.

(Preparation of Ink Base (b-4))

An ink base (b-4) was prepared in the same manner as in the preparation of the ink base (b-1) except that 30 parts by mass of 4-hydroxy-4'-methyldiphenyl sulfone was used as a color developer in place of 30 parts by mass of 4-hydroxy-4'-isopropoxydiphenyl sulfone.

(Preparation of Ink Base (b-5))

An ink base (b-5) was prepared in the same manner as in the preparation of the ink base (b-1) except that 30 parts by mass of 1,1-bis(4-hydroxydiphenyl)cyclohexane was used as a color developer in place of 30 parts by mass of 4-hydroxy-4'-isopropoxydiphenyl sulfone.

(Preparation of Ink Base (bc-1))

50 Parts by mass of the above varnish base, 20 parts by mass of 4-hydroxy-4'-isopropoxydiphenyl sulfone as a color developer, 10 parts by mass of aluminum hydroxide (average particle diameter 0.3 µm) as a pigment and 5 parts by mass of spindle oil were kneaded with a three-roll mill until the color developer had an average particle diameter of 2.0 µm. Further, 10 parts by mass of the above varnish and 5 parts by mass of spindle oil were added to prepare an ink base (bc-1).

(Preparation of Ink Base (bc-2))

An ink base (bc-2) was prepared in the same manner as in the preparation of the ink base (bc-1) except that 30 parts by mass of 2,4'-dihydroxydiphenyl sulfone was used as a color developer in place of 30 parts by mass of 4-hydroxy-4'-isopropoxydiphenyl sulfone.

(Preparation of Ink Base (bc-3))

An ink base (bc-3) was prepared in the same manner as in the preparation of the ink base (bc-1) except that 30 parts by mass of 4,4'-dihydroxydiphenyl sulfone was used as a color developer in place of 30 parts by mass of 4-hydroxy-4'-isopropoxydiphenyl sulfone.

(Preparation of Ink Base (bc-4))

50 Parts by mass of the above varnish base, 20 parts by mass of 4-hydroxy-4'-isopropoxydiphenyl sulfone as a color developer, 10 parts by mass of light calcium carbonate (average particle diameter 1.0 μm) as a pigment and 5 parts by mass of spindle oil were kneaded with a three-roll mill until the color developer had an average particle diameter of 2.0 μm. Further, 10 parts by mass of the above varnish base and 5 parts by mass of spindle oil were added to prepare an ink base (bc-4).

(Preparation of Ink Base (bc-5))

An ink base (bc-5) was prepared in the same manner as in the preparation of the ink base (bc-4) except that 30 parts by mass of 2,4'-dihydroxydiphenyl sulfone was used as a color developer in place of 30 parts by mass of 4-hydroxy-4'-isopropoxydiphenyl sulfone.

(Preparation of Ink Base (bc-6))

An ink base (bc-6) was prepared in the same manner as in the preparation of the ink base (bc-4) except that 30 parts by mass of 4,4'-dihydroxydiphenyl sulfone was used as a color developer in place of 30 parts by mass of 4-hydroxy-4'-isopropoxydiphenyl sulfone.

(Preparation of Ink Base (c-1))

65 Parts by mass of the above varnish base, 30 parts by mass of aluminum hydroxide (average particle diameter 0.3 μm) as a pigment, 5 parts by mass of spindle oil and 5 parts by mass of soybean oil were kneaded with a three-roll mill to prepare an ink base (c-1).

(Preparation of Ink Base (c-2))

An ink base (c-2) was prepared in the same manner as in the preparation of the ink base (c-1) except that 30 parts by mass of light calcium carbonate having an average particle diameter of 1.0 μm was used as a pigment in place of 30 parts by mass of aluminum hydroxide having an average particle diameter of 0.3 μm.

In the following Examples, Examples 1 to 89 are Examples of the scratch color-developable ink (A), and Examples 90 to 97 are Examples of the scratch color-developable ink (B).

Example 1

100 Parts by mass of the ink base (a-1) and 200 parts by mass of the ink base (b-1) were mixed, 0.2% by mass, based on the total amount of the above ink bases, of a dryer (manganese naphthenate) was added, and 10 parts by mass of spindle oil was also added. And, the mixture was homogenized by fully stirring it to give a scratch color-developable ink. Solid particles contained in the ink had an average particle diameter of 2.0 μm. Further, the number of coarse particles having a particle diameter of 30 μm or more per gram of the thus-obtained scratch color-developable ink was found to be only 100 pieces.

The obtained scratch color-developable ink was measured for an acid value in the same manner as in the measurement of the varnish base to show 7 mgKOH/g. (However, it was assumed that a difference between acid values of the ink base (b-1) and the ink base (a-1), measured separately, was an amount of KOH consumed by the color developer, so that the above value was that which was obtained by deducting such an amount.)

Example 2

A scratch color-developable ink was obtained in the same manner as in Example 1 except that 100 parts by mass of the ink base (a-2) was used in place of 100 parts by mass of the ink base (a-1) (The number of coarse particles having a particle diameter of 30 μm or more per gram of the ink was 100 pieces).

Example 3

A scratch color-developable ink was obtained in the same manner as in Example 1 except that 100 parts by mass of the ink base (a-3) was used in place of 100 parts by mass of the ink base (a-1) (The number of coarse particles having a particle diameter of 30 μm or more per gram of the ink was 100 pieces).

Example 4

A scratch color-developable ink was obtained in the same manner as in Example 1 except that 100 parts by mass of the ink base (a-4) was used in place of 100 parts by mass of the ink base (a-1) (The number of coarse particles having a particle diameter of 30 μm or more per gram of the ink was 100 pieces).

Example 5

A scratch color-developable ink was obtained in the same manner as in Example 1 except that 200 parts by mass of the ink base (b-2) was used in place of 200 parts by mass of the ink base (b-1) (The number of coarse particles having a particle diameter of 30 μm or more per gram of the ink was 100 pieces).

Example 6

A scratch color-developable ink was obtained in the same manner as in Example 1 except that 200 parts by mass of the ink base (b-3) was used in place of 200 parts by mass of the ink base (b-1) (The number of coarse particles having a particle diameter of 30 μm or more per gram of the ink was 100 pieces).

Example 7

A scratch color-developable ink was obtained in the same manner as in Example 1 except that 200 parts by mass of the ink base (b-4) was used in place of 200 parts by mass of the ink base (b-1) (The number of coarse particles having a particle diameter of 30 μm or more per gram of the ink was 100 pieces).

Example 8

A scratch color-developable ink was obtained in the same manner as in Example 1 except that 200 parts by mass of the ink base (b-5) was used in place of 200 parts by mass of the ink base (b-1) (The number of coarse particles having a particle diameter of 30 μm or more per gram of the ink was 100 pieces).

Example 9

100 Parts by mass of the ink base (a-1) and 100 parts by mass of the ink base (b-1) were mixed, 0.2% by mass, based on the total amount of the above ink bases, of a dryer (manganese naphthenate) was added, and 10 parts by mass of spindle oil was also added. And, the mixture was homogenized by fully stirring it to give a scratch color-developable ink. The number of coarse particles having a particle diameter of 30 μm or more per gram of the ink was 100 pieces. Solid particles contained in the ink had an average particle diameter of 2.0 μm. The thus-obtained scratch color-developable ink was measured for an acid value in the same manner as in Example 1 to show 7 mgKOH/g.

Example 10

100 Parts by mass of the ink base (a-1) and 300 parts by mass of the ink base (b-1) were mixed, 0.2% by mass, based on the total amount of the above ink bases, of a dryer (manganese naphthenate) was added, and 10 parts by mass of spindle oil was also added. And, the mixture was homogenized by fully stirring it to give a scratch color-developable ink. The number of coarse particles having a particle diameter of 30 μm or more per gram of the ink was 100 pieces. Solid particles contained in the ink had an average particle diameter of 2.0 μm. The thus-obtained scratch color-developable ink was measured for an acid value in the same manner as in Example 1 to show 7 mgKOH/g.

Example 11

200 Parts by mass of the ink base (a-1) and 100 parts by mass of the ink base (b-1) were mixed, 0.2% by mass, based on the total amount of the above ink bases, of a dryer (manganese naphthenate) was added, and 10 parts by mass of spindle oil was also added. And, the mixture was homogenized by fully stirring it to give a scratch color-developable ink. The number of coarse particles having a particle diameter of 30 μm or more per gram of the ink was 100 pieces. Solid particles contained in the ink had an average particle diameter of 2.0 μm. The thus-obtained scratch color-developable ink was measured for an acid value in the same manner as in Example 1 to show 7 mgKOH/g.

Example 12

50 Parts by mass of the ink base (a-1) and 250 parts by mass of the ink base (b-1) were mixed, 0.2% by mass, based on the total amount of the above ink bases, of a dryer (manganese naphthenate) was added, and 10 parts by mass of spindle oil was also added. And, the mixture was homogenized by fully stirring it to give a scratch color-developable ink. The number of coarse particles having a particle diameter of 30 μm or more per gram of the ink was 100 pieces. Solid particles contained in the ink had an average particle diameter of 2.0 μm. The thus-obtained scratch color-developable ink was measured for an acid value in the same manner as in Example 1 to show 7 mgKOH/g.

Example 13

100 Parts by mass of the ink base (a-1), 200 parts by mass of the ink base (b-1) and 100 parts by mass of the ink base (c-1) were mixed, 0.2% by mass, based on the total amount of the above ink bases, of a dryer (manganese naphthenate) was added, and 10 parts by mass of spindle oil was also added. And, the mixture was homogenized by fully stirring it to give a scratch color-developable ink. The number of coarse particles having a particle diameter of 30 μm or more per gram of the ink was 100 pieces. Solid particles contained in the ink had an average particle diameter of 1.8 μm. The thus-obtained scratch color-developable ink was measured for an acid value in the same manner as in Example 1 to show 7 mgKOH/g.

Example 14

A scratch color-developable ink was obtained in the same manner as in Example 13 except that 100 parts by mass of the ink base (c-2) was used in place of 100 parts by mass of the ink base (c-1). The number of coarse particles having a particle diameter of 30 μm or more per gram of the ink was 100 pieces. Solid particles contained in the ink had an average particle diameter of 1.9 μm.

Example 15

150 Parts by mass of the ink base (ac-1) and 300 parts by mass of the ink base (bc-1) were mixed, 0.2% by mass, based on the total amount of the above ink bases, of a dryer (manganese naphthenate) was added, and 10 parts by mass of spindle oil was also added. And, the mixture was homogenized by fully stirring it to give a scratch color-developable ink. In the thus-obtained scratch color-developable ink, the number of coarse particles having a particle diameter of 30 μm or more per gram of the ink was 100 pieces. Solid particles contained in the ink had an average particle diameter of 1.8 μm. The obtained scratch color-developable ink was measured for an acid value in the same manner as in Example 1 to show 7 mgKOH/g.

Example 16

A scratch color-developable ink was obtained in the same manner as in Example 15 except that 150 parts by mass of the ink base (ac-2) was used in place of 150 parts by mass of the ink base (ac-1). In the thus-obtained scratch color-developable ink, the number of coarse particles having a particle diameter of 30 μm or more per gram of the ink was 100 pieces.

Example 17

A scratch color-developable ink was obtained in the same manner as in Example 15 except that 150 parts by mass of the ink base (ac-3) was used in place of 150 parts by mass of the ink base (ac-1). In the thus-obtained scratch color-developable ink, the number of coarse particles having a particle diameter of 30 μm or more per gram of the ink was 100 pieces.

Example 18

A scratch color-developable ink was obtained in the same manner as in Example 15 except that 150 parts by mass of the ink base (ac-4) was used in place of 150 parts by mass of the ink base (ac-1). In the thus-obtained scratch color-developable ink, the number of coarse particles having a particle diameter of 30 μm or more per gram of the ink was 100 pieces.

Example 19

A scratch color-developable ink was obtained in the same manner as in Example 15 except that 150 parts by mass of the ink base (ac-5) was used in place of 150 parts by mass of the ink base (ac-1). In the thus-obtained scratch color-developable ink, the number of coarse particles having a particle diameter of 30 μm or more per gram of the ink was 100 pieces.

Example 20

A scratch color-developable ink was obtained in the same manner as in Example 15 except that 150 parts by mass of the ink base (ac-6) was used in place of 150 parts by mass of the ink base (ac-1). In the thus-obtained scratch color-developable ink, the number of coarse particles having a particle diameter of 30 μm or more per gram of the ink was 100 pieces.

Example 21

A scratch color-developable ink was obtained in the same manner as in Example 15 except that 300 parts by mass of the ink base (bc-2) was used in place of 300 parts by mass of the ink base (bc-1). In the thus-obtained scratch color-developable ink, the number of coarse particles having a particle diameter of 30 μm or more per gram of the ink was 100 pieces.

Example 22

A scratch color-developable ink was obtained in the same manner as in Example 15 except that 300 parts by mass of the ink base (bc-3) was used in place of 300 parts by mass of the ink base (bc-1). In the thus-obtained scratch color-developable ink, the number of coarse particles having a particle diameter of 30 μm or more per gram of the ink was 100 pieces.

Example 23

A scratch color-developable ink was obtained in the same manner as in Example 15 except that 300 parts by mass of the ink base (bc-4) was used in place of 300 parts by mass of the ink base (bc-1). In the thus-obtained scratch color-developable ink, the number of coarse particles having a particle diameter of 30 μm or more per gram of the ink was 100 pieces.

Example 24

A scratch color-developable ink was obtained in the same manner as in Example 15 except that 300 parts by mass of the ink base (bc-5) was used in place of 300 parts by mass of the ink base (bc-1). In the thus-obtained scratch color-developable ink, the number of coarse particles having a particle diameter of 30 μm or more per gram of the ink was 100 pieces.

Example 25

A scratch color-developable ink was obtained in the same manner as in Example 15 except that 300 parts by mass of the ink base (bc-6) was used in place of 300 parts by mass of the ink base (bc-1). In the thus-obtained scratch color-developable ink, the number of coarse particles having a particle diameter of 30 μm or more per gram of the ink was 100 pieces.

Comparative Example 1

100 Parts by mass of the ink base (a-1) and 50 parts by mass of the ink base (c-1) were mixed, 0.2% by mass, based on the total amount of the above ink bases, of a dryer (manganese naphthenate) was added, and 5 parts by mass of spindle oil was also added. And, the mixture was homogenized by fully stirring it to give a dummy ink of a scratch color-developable ink. Solid particles contained in the ink had an average particle diameter of 1.9 μm. The obtained dummy ink was measured for an acid value in the same manner as in the measurement of the above varnish base to show 7 mgKOH/g.

Comparative Example 2

A dummy ink of a scratch color-developable ink was obtained in the same manner as in Comparative Example 1 except that 100 parts by mass of the ink base (a-2) was used in place of 100 parts by mass of the ink base (a-1).

Comparative Example 3

A dummy ink of a scratch color-developable ink was obtained in the same manner as in Comparative Example 1 except that 100 parts by mass of the ink base (a-3) was used in place of 100 parts by mass of the ink base (a-1).

Comparative Example 4

A dummy ink of a scratch color-developable ink was obtained in the same manner as in Comparative Example 1 except that 100 parts by mass of the ink base (a-4) was used in place of 100 parts by mass of the ink base (a-1).

Comparative Example 5

A dummy ink of a scratch color-developable ink was obtained in the same manner as in Comparative Example 1 except that 100 parts by mass of the ink base (b-1) was used in place of 100 parts by mass of the ink base (a-1).

Example 26

Preparation of Coated Paper Support

A coating layer for the following composition was applied onto the surface of a paper support having a basis weight of 80 g/m$^2$ with a blade coater and dried so as to ensure a coating amount of 7 g/m$^2$ in a dry state, and the applied coating was super calender-treated (rigid roll: a chilled roll having an outer diameter of 500 mm, elastic roll: a resin roll having an outer diameter of 500 mm, linear pressure: 1.47 KN/cm, temperature: 60° C.) to give a coated paper that was a support.

| | |
|---|---|
| Kaolin (average particle diameter 1.5 μm) | 30 parts by mass |
| Light calcium carbonate (average particle diameter 1.8 μm) | 70 parts by mass |
| Phosphoric esterified starch | 5 parts by mass |
| Styrene/butadiene latex | 10 parts by mass |

The thus-obtained coated paper had a visible light transmittance of 9%.

(Preparation of Invisible Information Printed Sheet)

One-digit Arabic numerals of 0 to 9 and geometric patterns of a triangle, a square and a circle (solid printing of a triangle, a square and a circle with an ink, e.g., when a pattern design is a circle, the circle will appear as a solid black circle when a black color is developed) were offset-printed on the coating layer surface of the coated paper in an ink film thickness of 0.6 μm with the scratch color-developable ink obtained in Example 1, to give an invisible information printed sheet.

Examples 27-50

Invisible information printed sheets of Examples 27 to 50 were obtained in the same manner as in Example 26 except that the scratch color-developable inks obtained in Examples 2 to 25 were used in place of the scratch color-developable ink obtained in Example 1. The correspondence of Example Numbers of the scratch color-developable inks used and Example Numbers of the invisible information printed sheets is as follows (the correspondence of Example 26 is included in the correspondence list as well).

| Scratch color-developable ink | Invisible information printed sheet |
|---|---|
| Example 1 | Example 26 |
| Example 2 | Example 27 |
| Example 3 | Example 28 |
| Example 4 | Example 29 |
| Example 5 | Example 30 |
| Example 6 | Example 31 |
| Example 7 | Example 32 |
| Example 8 | Example 33 |
| Example 9 | Example 34 |
| Example 10 | Example 35 |
| Example 11 | Example 36 |
| Example 12 | Example 37 |
| Example 13 | Example 38 |
| Example 14 | Example 39 |
| Example 15 | Example 40 |
| Example 16 | Example 41 |
| Example 17 | Example 42 |
| Example 18 | Example 43 |
| Example 19 | Example 44 |
| Example 20 | Example 45 |
| Example 21 | Example 46 |
| Example 22 | Example 47 |
| Example 23 | Example 48 |
| Example 24 | Example 49 |
| Example 25 | Example 50 |

Comparative Examples 6-10

Invisible information printed sheets of Comparative Examples 6 to 10 were obtained in the same manner as in Example 26 except that the dummy inks obtained in Comparative Examples 1 to 5 were used in place of the scratch color-developable ink obtained in Example 1. The correspondence of Comparative Example Numbers of the dummy inks used and Comparative Example Numbers of the invisible information printed sheets is as follows.

| Dummy ink | Invisible information printed sheet |
|---|---|
| Comparative Example 1 | Comparative Example 6 |
| Comparative Example 2 | Comparative Example 7 |
| Comparative Example 3 | Comparative Example 8 |
| Comparative Example 4 | Comparative Example 9 |
| Comparative Example 5 | Comparative Example 10 |

Examples 51-60

Invisible information printed sheets of Examples 51 to 60 were obtained in the same manner as in Example 26 except that the ink film thickness was changed as follows (Example 26 is included in the following list as well).

| Ink film thickness ($\mu m$) | Invisible information printed sheet |
|---|---|
| 0.3 | Example 51 |
| 0.4 | Example 52 |
| 0.5 | Example 53 |
| 0.6 | Example 26 |
| 0.8 | Example 54 |
| 1.0 | Example 55 |
| 1.2 | Example 56 |
| 1.4 | Example 57 |
| 1.6 | Example 58 |
| 1.8 | Example 59 |
| 2.0 | Example 60 |

Examples 61-70

Invisible information printed sheets of Examples 61 to 70 were obtained in the same manner as in Example 26 except that the basis weight of the paper support was changed as follows (Example 26 is included in the following list as well).

| Basis weight ($g/m^2$) of paper support | Invisible information printed sheet |
|---|---|
| 30 | Example 61 |
| 40 | Example 62 |
| 50 | Example 63 |
| 80 | Example 26 |
| 100 | Example 64 |
| 120 | Example 65 |
| 150 | Example 66 |
| 170 | Example 67 |
| 200 | Example 68 |
| 250 | Example 69 |
| 300 | Example 70 |

Coated paper supports were obtained from paper supports in the same manner as in Example 26, while all of these coated paper supports had a visible light transmittance of 20% or less, and when corresponding paper supports had a basis weight of 80 $g/m^2$ or more, coated paper supports had a visible light transmittance of 10% or less. Further, when corresponding paper supports had a basis weight of 100 $g/m^2$ or more, coated paper supports had a visible light transmittance of 5% or less.

Examples 71-77

Invisible information printed sheets of Examples 71 to 77 were obtained in the same manner as in Example 26 except that the following support without any coating layer was used in place of the coated paper used in Example 26 to carry out offset printing (Example 26 is included in the following list as well).

| Type and basis weight ($g/m^2$) of support | | Invisible information printed sheet |
|---|---|---|
| Coated paper | 80 | Example 26 |
| Woodfree paper | 50 | Example 71 |
| Woodfree paper | 100 | Example 72 |
| Wood-containing paper | 100 | Example 73 |
| White PET film | 100 | Example 74 |
| Formed PET film | 100 | Example 75 |

-continued

| Type and basis weight (g/m²) of support | | Invisible information printed sheet |
|---|---|---|
| Polypropylene synthetic paper | 80 | Example 76 |
| Polyethylene resin-coated paper | 200 | Example 77 |

With regard to the invisible light transmittances of the above support, those of the white PET (PET: polyethylene terephthalate) film, the foamed PET film, the polypropylene synthetic paper and the polyethylene resin-coated paper were 5% or less, that of the coated paper was 9%, those of the woodfree paper having a basis weight of 100 g/m² and the wood-containing paper were 9%, and that of the woodfree paper having a basis weight of 50 g/m² was 20%.

Comparative Example 11

Preparation of Dye Precursor-Containing Microcapsule Liquid

10 Parts of crystal violet lactone as a dye precursor was dissolved in 90 parts of a diaryl solvent (Hisol SASN-296: supplied by Nippon Oil Corporation) that was a hydrophobic solvent, to obtain a dye precursor solution. 100 Parts of the above dye precursor solution was gradually added to 100 parts of a 5% styrene-maleic anhydride copolymer aqueous solution with strong stirring, and the stirring was continued until a volume average particle diameter by a Coulter counter became 5 μm to give an emulsion. Separately, a melamine-formaldehyde initial condensate aqueous solution obtained by heating and dissolving 7 parts of melamine, 18 parts of a 37% formaldehyde aqueous solution and 30 parts of water was added to the emulsion, and the mixture was stirred at a temperature of 75° C. for 3 hours to give a dye precursor-containing microcapsule liquid.

With a self-color-developable ink prepared by mixing 100 parts of the above dye precursor-containing microcapsule liquid, 100 parts of a p-phenylphenol-formaldehyde resin (PPP resin: supplied by Sumitomo Durez), 20 parts of wheat starch and 60 parts of a styrene-butadiene copolymer latex, printing was made on the same paper support as that used in Example 26 to ensure a film thickness of 0.6 μm, to give an invisible information printed sheet of Comparative Example 11. Printing contents (numerals and geometric patterns) were the same as those in Example 26.

Comparative Example 12

Information of the same contents as those in Example 26 was printed on the same support as that used in Example 26 with a general black offset printing ink, and an aluminum paste offset printing ink was solid-printed thereon to give an invisible information printed sheet.

Table 1-1 and Table 1-2 show the constitutions of the invisible information printed sheets obtained in Examples 26 to 77 and Comparative Examples 6 to 12.
Evaluation 1 (Evaluation of Invisibility of Printed Portion)

A non-printed portion and a printed portion of the scratch color-developable ink on the support surface of each of the invisible information printed sheets obtained in Examples 26 to 77 and Comparative Examples 6 to 11 were measured for 60-degree specular glossiness values and 75-degree specular glossiness values, and a ratio of the 60-degree specular glossiness values and ratio of 75-degree specular glossiness values were calculated. Tables 3 to 5 show the results.

Further, the invisible information printed sheets obtained in Examples 26 to 77 and Comparative Examples 6 to 11 were visually observed to evaluate them for invisibility on the basis of the following four ratings. ◉ (double circle) shows that no information was visually recognized. ○ (single circle) shows that the information was mostly practically not visually recognized. Δ (triangle) shows that although there was a glossiness ratio or color difference to some degree, the information was difficult to visually recognize. x shows that the information was visually recognized. Tables 6 to 9 show the results.

Results of the following test participant Evaluations including this Evaluation except Evaluation 2 on scratch dust are results of evaluations that were carried out by 20 test participants of twenties of age who were excellent in eyesight and attentiveness and familiar with existing concealed scratchcards. In the above ratings, ◉ (double circle) means that 90% or more of the test participants could not visually recognize the information, ○ (single circle) means that 80% or more could not visually recognize it, Δ (triangle) means that 60% or more could not visually recognize it, and x means that only less than 60% was could not visually recognize it (comments (glossiness, intensity, etc.,) by the participants were also taken into account).
Evaluation 2 (Evaluation of Coloring Sensitivity and Developed Color Intensity of Printed Portion)

Printed portions of the invisible information printed sheets obtained in Examples 26 to 77 and Comparative Examples 6 to 12 were rubbed with finger nails to evaluate them for coloring sensitivity and developed color intensity. Further, they were rubbed with a hundred yen coin to evaluate them like the case using a finger nail. The results of evaluations with a finger nail and a hundred yen coin are expressed as nail sensitivity, nail intensity, coin sensitivity and coin intensity. Tables 6 to 9 show the results.

With regard to the coloring sensitivity (nail sensitivity and coin sensitivity), ◉ (double circle) means that 90% or more of the test participants could develop a color with a light force, ○ (single circle) means that 80% or more of the test participants could develop a color with a light force, Δ (triangle) means that less than 80% or more of the test participants could develop a color with a light force and that the rest could finally develop a color with a strong force, and x means that 50% or more of the test participants failed to develop a color. With regard to the developed color intensity (nail intensity and coin intensity), ◉ (double circle) means that 90% or more of the test participants could obtain an excellent developed color and also had excellently readable information (excellent discrimination of numerals and geometric patterns of a developed color), and ○ (single circle) means that 80% or more of the test participants could obtain an excellent developed color and also had excellently readable information (excellent discrimination of numerals and geometric patterns of a developed color). Δ (triangle) means that all the test participants could read information which was, however, unclear to some extent and that 20% or more of them read the numerals or geometric patterns wrongly (e.g., 8 of the numerals was taken for 3 wrongly, etc.), and x means that 50% or more of the test participants could not read the information or read it wrongly.

With regard to the evaluation of scratch dust by scratching a printed portion with a scratch color-developable ink, five test participants who could perform scratching carefully were selected, and were caused to develop a color on entire surface of the geometric pattern portion and its circumference for the evaluation. Tables 6 to 9 show the results.

The evaluation results of the scratching dust will be described below. In Tables, ○ (single circle) means that no scratching dust occurred, and x means that scratching dust occurred. When the color was developed by the scratching, no scratching dust occurred in any one of all the Examples and Comparative Examples 6 to 11. In Comparative Example 12, scratching dust occurred.

Evaluation 3 (Evaluation of Soiling on Printed Portion)

The invisible information printed sheets obtained in one of Examples 26 to 77 and Comparative Examples 6 to 12 were stacked one on the other with their printed portions kept in contact with each other, a top sheet was moved back and forth twice to rub against the other, and the printed surfaces were evaluated for soiling on the basis of the following four ratings. Tables 6 to 9 show the results. ⊚ (double circle) means that 90% or more of the test participants recognized no soiling on developed color, ○ (single circle) means that 80% or more of the test participants recognized no soiling on developed color, Δ (triangle) means that 20% or more of the test participants recognized soiling on developed color and that 80% or more could not visually recognize (read out) the invisible information, and x means that soiling on developed color occurred and that 20% or more of the test participants could read out the invisible information.

Evaluation 4 (Evaluation of Heat Resistance of Printed Portion)

The invisible information printed sheets obtained in Examples 26 to 77 and Comparative Examples 6 to 12 were brought and kept in contact with a hot stamp at 100° C. for 5 seconds, and evaluations having the same contents as those in Evaluation 1 by the test participants were carried out. Tables 6 to 9 show the results. In Tables, ⊚ (double circle), ○ (single circle), Δ (triangle) and x mean the same evaluation ratings as those in Evaluation 1.

Evaluation 5 (Evaluation of Writing Pressure Resistance of Printed Portion)

A copy paper was placed on the geometric pattern printed portion of each of the invisible information printed sheets obtained in Examples 26 to 77 and Comparative Examples 6 to 12, and Arabic numerals were written thereon with a ballpoint pen. Then, the geometric pattern printed portion of each invisible information printed sheet was evaluated for color development degree of the Arabic numerals. ⊚ (double circle) means that 90% or more could not visually recognize them, ○ (single circle) means that 80% or more could not do so, Δ (triangle) means that 60% or more could not visually recognize them, and x mean that only less than 60% could visually recognize them. Tables 6 to 9 show the results.

Evaluation 6 (Evaluation of Light Resistance of Printed Portion)

The invisible information printed sheets obtained in Examples 26 to 77 and Comparative Examples 6 to 12 were exposed to sunlight for 12 hours, and evaluations having the same contents as those in Evaluation 1 by the test participants were carried out. Tables 6 to 9 show the results. In Tables, ⊚ (double circle), ○ (single circle), Δ (triangle) and x mean the same evaluation ratings as those in Evaluation 1.

Evaluation 7 (Evaluation of Water Resistance of Printed Portion)

The invisible information printed sheets obtained in Examples 26 to 77 and Comparative Examples 6 to 12 were immersed in water and naturally dried, and evaluations having the same contents as those in Evaluation 1 by the test participants were carried out. Tables 6 to 9 show the results. In Tables, ⊚ (double circle), ○ (single circle), Δ (triangle) and x mean the same evaluation ratings as those in Evaluation 1.

TABLE 1-1

| | | Scratch color-developable ink | | | | | | |
|---|---|---|---|---|---|---|---|---|
| | Ink Preparation Example | Mass ratio (dye/developer/ pigment) | Ink base | Dye species (Note 1) | Color developer species (Note 2) | Pigment species (Note 3) | Support (basis weight/m²) | Film thickness (μm) |
| Example 26 | Example 1 | 1/2/0 | a + b | YK2 | D8 | Nil | Coated paper (80) | 0.6 |
| Example 27 | Example 2 | 1/2/0 | a + b | BL2 | D8 | Nil | Coated paper (80) | 0.6 |
| Example 28 | Example 3 | 1/2/0 | a + b | CVL | D8 | Nil | Coated paper (80) | 0.6 |
| Example 29 | Example 4 | 1/2/0 | a + b | PSDV | D8 | Nil | Coated paper (80) | 0.6 |
| Example 30 | Example 5 | 1/2/0 | a + b | YK2 | 24 | Nil | Coated paper (80) | 0.6 |
| Example 31 | Example 6 | 1/2/0 | a + b | YK2 | 44 | Nil | Coated paper (80) | 0.6 |
| Example 32 | Example 7 | 1/2/0 | a + b | YK2 | 2000 | Nil | Coated paper (80) | 0.6 |
| Example 33 | Example 8 | 1/2/0 | a + b | YK2 | AW | Nil | Coated paper (80) | 0.6 |
| Example 34 | Example 9 | 1/1/0 | a + b | YK2 | D8 | Nil | Coated paper (80) | 0.6 |
| Example 35 | Example 10 | 1/3/0 | a + b | YK2 | D8 | Nil | Coated paper (80) | 0.6 |
| Example 36 | Example 11 | 1/0.5/0 | a + b | YK2 | D8 | Nil | Coated paper (80) | 0.6 |
| Example 37 | Example 12 | 1/5/0 | a + b | YK2 | D8 | Nil | Coated paper (80) | 0.6 |
| Example 38 | Example 13 | 1/2/1 | a + b + c | YK2 | D8 | AlHy | Coated paper (80) | 0.6 |
| Example 39 | Example 14 | 1/2/1 | a + b + c | YK2 | D8 | LCaCa | Coated paper (80) | 0.6 |
| Example 40 | Example 15 | 1/2/1.5 | ac + bc | YK2 | D8 | AlHy | Coated paper (80) | 0.6 |
| Example 41 | Example 16 | 1/2/1.5 | ac + bc | BL2 | D8 | AlHy | Coated paper (80) | 0.6 |
| Example 42 | Example 17 | 1/2/1.5 | ac + bc | CVL | D8 | AlHy | Coated paper (80) | 0.6 |
| Example 43 | Example 18 | 1/2/1.5 | ac + bc | YK2 | D8 | AlHy + LCaCa | Coated paper (80) | 0.6 |
| Example 44 | Example 19 | 1/2/1.5 | ac + bc | BL2 | D8 | AlHy + LCaCa | Coated paper (80) | 0.6 |
| Example 45 | Example 20 | 1/2/1.5 | ac + bc | CVL | D8 | AlHy + | Coated paper (80) | 0.6 |
| Example 46 | Example 21 | 1/2/1.5 | ac + bc | YK2 | 24 | AlHy | Coated paper (80) | 0.6 |
| Example 47 | Example 22 | 1/2/1.5 | ac + bc | YK2 | 44 | AlHy | Coated paper (80) | 0.6 |
| Example 48 | Example 23 | 1/2/1.5 | ac + bc | YK2 | D8 | AlHy + LCaCa | Coated paper (80) | 0.6 |
| Example 49 | Example 24 | 1/2/1.5 | ac + bc | YK2 | 24 | AlHy + LCaCa | Coated paper (80) | 0.6 |

TABLE 1-1-continued

Scratch color-developable ink

| | Ink Preparation Example | Mass ratio (dye/developer/ pigment) | Ink base | Dye species (Note 1) | Color developer species (Note 2) | Pigment species (Note 3) | Support (basis weight/m$^2$) | Film thickness (μm) |
|---|---|---|---|---|---|---|---|---|
| Example 50 | Example 25 | 1/2/1.5 | ac + bc | YK2 | 44 | AlHy + LCaCa | Coated paper (80) | 0.6 |

(Note 1)
YK2 3-diethylamino-6-methyl-7-anilinofluorane
BL2 3-dbutylamino-6-methyl-7-anilinofluorane
CVL Crystal violet lactone
PSDV 3-diethylamino-6-chloro-7-anilinofluorane
(Note 2)
D8 4-hydroxy-4'-isopropoxydiphenyl sulfone
24 2,4'-dihydroxydiphenyl sulfone
44 4,4'-dihydroxydiphenyl sulfone
2000 4-hydroxy-4'-methyldiphenyl sulfone
AW 1,1-bis(4-hydroxydiphenyl)cyclohexane
(Note 3)
Alhy Aluminum hydroxide
LCaCa Light calcium carbonate

TABLE 1-2

Scratch color-developable ink

| | Ink Preparation Example, etc. | Mass ratio (dye/developer/ pigment) | Ink base | Dye species (Note 1) | Color developer species (Note 2) | Pigment species (Note 3) | Support (basis weight/m$^2$) | Film thickness (μm) |
|---|---|---|---|---|---|---|---|---|
| Example 51 | Example 1 | 1/2/0 | a + b | YK2 | D8 | Nil | Coated paper (80) | 0.3 |
| Example 52 | Example 1 | 1/2/0 | a + b | YK2 | D8 | Nil | Coated paper (80) | 0.4 |
| Example 53 | Example 1 | 1/2/0 | a + b | YK2 | D8 | Nil | Coated paper (80) | 0.5 |
| Example 54 | Example 1 | 1/2/0 | a + b | YK2 | D8 | Nil | Coated paper (80) | 0.8 |
| Example 55 | Example 1 | 1/2/0 | a + b | YK2 | D8 | Nil | Coated paper (80) | 1.0 |
| Example 56 | Example 1 | 1/2/0 | a + b | YK2 | D8 | Nil | Coated paper (80) | 1.2 |
| Example 57 | Example 1 | 1/2/0 | a + b | YK2 | D8 | Nil | Coated paper (80) | 1.4 |
| Example 58 | Example 1 | 1/2/0 | a + b | YK2 | D8 | Nil | Coated paper (80) | 1.6 |
| Example 59 | Example 1 | 1/2/0 | a + b | YK2 | D8 | Nil | Coated paper (80) | 1.8 |
| Example 60 | Example 1 | 1/2/0 | a + b | YK2 | D8 | Nil | Coated paper (80) | 2.0 |
| Example 61 | Example 1 | 1/2/0 | a + b | YK2 | D8 | Nil | Coated paper (30) | 0.6 |
| Example 62 | Example 1 | 1/2/0 | a + b | YK2 | D8 | Nil | Coated paper (40) | 0.6 |
| Example 63 | Example 1 | 1/2/0 | a + b | YK2 | D8 | Nil | Coated paper (50) | 0.6 |
| Example 64 | Example 1 | 1/2/0 | a + b | YK2 | D8 | Nil | Coated paper (100) | 0.6 |
| Example 65 | Example 1 | 1/2/0 | a + b | YK2 | D8 | Nil | Coated paper (120) | 0.6 |
| Example 66 | Example 1 | 1/2/0 | a + b | YK2 | D8 | Nil | Coated paper (150) | 0.6 |
| Example 67 | Example 1 | 1/2/0 | a + b | YK2 | D8 | Nil | Coated paper (170) | 0.6 |
| Example 68 | Example 1 | 1/2/0 | a + b | YK2 | D8 | Nil | Coated paper (200) | 0.6 |
| Example 69 | Example 1 | 1/2/0 | a + b | YK2 | D8 | Nil | Coated paper (250) | 0.6 |
| Example 70 | Example 1 | 1/2/0 | a + b | YK2 | D8 | Nil | Coated paper (300) | 0.6 |
| Example 71 | Example 1 | 1/2/0 | a + b | YK2 | D8 | Nil | Woodfree paper (50) | 0.6 |
| Example 72 | Example 1 | 1/2/0 | a + b | YK2 | D8 | Nil | Woodfree paper (100) | 0.6 |
| Example 73 | Example 1 | 1/2/0 | a + b | YK2 | D8 | Nil | Wood-containing paper (100) | 0.6 |
| Example 74 | Example 1 | 1/2/0 | a + b | YK2 | D8 | Nil | White PET (100) | 0.6 |
| Example 75 | Example 1 | 1/2/0 | a + b | YK2 | D8 | Nil | Foamed PET (100) | 0.6 |
| Example 76 | Example 1 | 1/2/0 | a + b | YK2 | D8 | Nil | Polypropylene synthetic paper | 0.6 |
| Example 77 | Example 1 | 1/2/0 | a + b | YK2 | D8 | Nil | Polyethylene resin-coated paper (200) | 0.6 |
| Comparative Example 6 | Comparative Example 1 | 1/0/0.5 | a + c | YK2 | Nil | AlHy | Coated paper (80) | 0.6 |
| Comparative Example 7 | Comparative Example 2 | 1/0/0.5 | a + c | BL2 | Nil | AlHy | Coated paper (80) | 0.6 |
| Comparative Example 8 | Comparative Example 3 | 1/0/0.5 | a + c | CVL | Nil | AlHy | Coated paper (80) | 0.6 |
| Comparative Example 9 | Comparative Example 4 | 1/0/0.5 | a + c | PSDV | Nil | AlHy | Coated paper (80) | 0.6 |
| Comparative Example 10 | Comparative Example 5 | 0/1/0.5 | b + c | Nil | D8 | AlHy | Coated paper (80) | 0.6 |
| Comparative Example 11 | Pressure-sensitive self-color- | | | | | | | |

TABLE 1-2-continued

| Ink Preparation Example, etc. | Scratch color-developable ink | | | | | | |
|---|---|---|---|---|---|---|---|
| | Mass ratio (dye/developer/pigment) | Ink base | Dye species (Note 1) | Color developer species (Note 2) | Pigment species (Note 3) | Support (basis weight/m²) | Film thickness (μm) |
| Comparative Example 12 | Concealed | | | | | | |

(Note 1)
YK2 3-diethylamino-6-methyl-7-anilinofluorane
BL2 3-dbutylamino-6-methyl-7-anilinofluorane
CVL Crystal violet lactone
PSDV 3-diethylamino-6-chloro-7-anilinofluorane
(Note 2)
D8 4-hydroxy-4'-isopropoxydiphenyl sulfone
(Note 3)
Alhy Aluminum hydroxide

TABLE 2

| Samples | Evaluation 1 | | | | | | |
|---|---|---|---|---|---|---|---|
| | Invisibility | 60-degree specular glossiness of support (%) | 60-degree specular glossiness of printed portion (%) | Ratio of 60-degree specular glossiness values (%) | 75-degree specular glossiness of support (%) | 75-degree specular glossiness of printed portion (%) | Ratio of 75-degree specular glossiness values (%) |
| Example 26 | ○ | 6.4 | 4.8 | 75.0 | 18.4 | 8.8 | 47.8 |
| Example 27 | ○ | 6.4 | 4.4 | 68.8 | 18.4 | 8.3 | 45.1 |
| Example 28 | ○ | 6.4 | 4.6 | 71.9 | 18.4 | 8.6 | 46.7 |
| Example 29 | ○ | 6.4 | 4.2 | 65.6 | 18.4 | 8.1 | 44.0 |
| Example 30 | ○ | 6.4 | 4.9 | 76.6 | 18.4 | 8.9 | 48.4 |
| Example 31 | ○ | 6.4 | 5.1 | 79.7 | 18.4 | 9.2 | 50.0 |
| Example 32 | ○ | 6.4 | 4.8 | 75.0 | 18.4 | 8.8 | 47.8 |
| Example 33 | ○ | 6.4 | 4.7 | 73.4 | 18.4 | 8.6 | 46.7 |
| Example 34 | ○ | 6.4 | 4.4 | 68.8 | 18.4 | 8.5 | 46.2 |
| Example 35 | ○ | 6.4 | 4.4 | 68.8 | 18.4 | 8.6 | 46.7 |
| Example 36 | ○ | 6.4 | 4.8 | 75.0 | 18.4 | 8.8 | 47.8 |
| Example 37 | ○ | 6.4 | 4.8 | 75.0 | 18.4 | 8.8 | 47.8 |
| Example 38 | ◎ | 6.4 | 8.0 | 125.0 | 18.4 | 18.3 | 99.5 |
| Example 39 | ◎ | 6.4 | 8.5 | 132.8 | 18.4 | 16.4 | 89.1 |
| Example 40 | ◎ | 6.4 | 8.9 | 139.1 | 18.4 | 18.9 | 102.7 |
| Example 41 | ◎ | 6.4 | 8.7 | 135.9 | 18.4 | 18.2 | 98.9 |
| Example 42 | ◎ | 6.4 | 8.8 | 137.5 | 18.4 | 18.6 | 101.1 |
| Example 43 | ◎ | 6.4 | 8.4 | 131.3 | 18.4 | 17.1 | 92.9 |
| Example 44 | ◎ | 6.4 | 8.1 | 126.6 | 18.4 | 16.8 | 91.3 |
| Example 45 | ◎ | 6.4 | 8.3 | 129.7 | 18.4 | 17.0 | 92.4 |
| Example 46 | ◎ | 6.4 | 8.3 | 129.7 | 18.4 | 17.1 | 92.9 |
| Example 47 | ◎ | 6.4 | 8.5 | 132.8 | 18.4 | 17.4 | 94.6 |
| Example 48 | ◎ | 6.4 | 8.5 | 132.8 | 18.4 | 17.6 | 95.7 |
| Example 49 | ◎ | 6.4 | 8.6 | 134.4 | 18.4 | 18.0 | 97.8 |
| Example 50 | ◎ | 6.4 | 8.8 | 137.5 | 18.4 | 18.5 | 100.5 |
| Comparative Example 6 | ◎ | 6.4 | 9.1 | 142.2 | 18.4 | 19.1 | 103.8 |
| Comparative Example 7 | ◎ | 6.4 | 9.0 | 140.6 | 18.4 | 18.9 | 102.7 |
| Comparative Example 8 | ◎ | 6.4 | 8.9 | 139.1 | 18.4 | 18.8 | 102.2 |
| Comparative Example 9 | ◎ | 6.4 | 9.0 | 140.6 | 18.4 | 19.0 | 103.3 |
| Comparative Example 10 | ◎ | 6.4 | 8.5 | 132.8 | 18.4 | 17.7 | 96.2 |
| Comparative Example 11 | Δ | 6.4 | 3.8 | 59.4 | 18.4 | 6.6 | 35.9 |
| Comparative Example 12 | ◎ | Not measured | | | | | |

TABLE 3

Evaluation 1

| Sample | Invisibility | 60-degree specular glossiness of support (%) | 60-degree specular glossiness of printed portion (%) | Ratio of 60-degree specular glossiness values (%) | 75-degree specular glossiness of support (%) | 75-degree specular glossiness of printed portion (%) | Ratio of 75-degree specular glossiness values (%) |
|---|---|---|---|---|---|---|---|
| Example 26 | ○ | 6.4 | 4.8 | 75.0 | 18.4 | 8.8 | 47.8 |
| Example 51 | ⊚ | 6.4 | 5.0 | 78.1 | 18.4 | 9.1 | 49.5 |
| Example 52 | ⊚ | 6.4 | 5.1 | 79.7 | 18.4 | 9.1 | 49.5 |
| Example 53 | ⊚ | 6.4 | 5.0 | 78.1 | 18.4 | 9.0 | 48.9 |
| Example 54 | ○ | 6.4 | 4.7 | 73.4 | 18.4 | 8.7 | 47.3 |
| Example 55 | ○ | 6.4 | 4.8 | 75.0 | 18.4 | 8.8 | 47.8 |
| Example 56 | ○ | 6.4 | 4.8 | 75.0 | 18.4 | 8.8 | 47.8 |
| Example 57 | ○ | 6.4 | 4.9 | 76.6 | 18.4 | 9.0 | 48.9 |
| Example 58 | ○ | 6.4 | 5.0 | 78.1 | 18.4 | 9.2 | 50.0 |
| Example 59 | ○ | 6.4 | 5.0 | 78.1 | 18.4 | 9.2 | 50.0 |
| Example 60 | ○ | 6.4 | 5.0 | 78.1 | 18.4 | 9.2 | 50.0 |
| Comparative Example 11 | Δ | 6.4 | 3.8 | 59.4 | 18.4 | 6.6 | 35.9 |
| Comparative Example 12 | ⊚ | Not measured | | | | | |

TABLE 4

Evaluation 1

| Sample | Invisibility | 60-degree specular glossiness of support (%) | 60-degree specular glossiness of printed portion (%) | Ratio of 60-degree specular glossiness values (%) | 75-degree specular glossiness of support (%) | 75-degree specular glossiness of printed portion (%) | Ratio of 75-degree specular glossiness values (%) |
|---|---|---|---|---|---|---|---|
| Example 26 | ○ | 6.4 | 4.8 | 75.0 | 18.4 | 8.8 | 47.8 |
| Example 61 | ⊚ | 6.2 | 4.7 | 75.8 | 18.0 | 8.6 | 47.8 |
| Example 62 | ⊚ | 6.3 | 4.7 | 74.6 | 18.2 | 8.7 | 47.8 |
| Example 63 | ⊚ | 6.4 | 4.8 | 75.0 | 18.4 | 8.8 | 48.4 |
| Example 64 | ○ | 6.4 | 4.8 | 75.0 | 18.5 | 9.0 | 48.6 |
| Example 65 | ○ | 6.4 | 4.8 | 75.0 | 18.5 | 9.0 | 48.6 |
| Example 66 | ○ | 6.5 | 4.9 | 75.4 | 18.6 | 9.2 | 49.5 |
| Example 67 | ○ | 6.5 | 4.9 | 75.4 | 18.6 | 9.3 | 50.0 |
| Example 68 | ○ | 6.5 | 4.9 | 75.4 | 18.7 | 9.5 | 50.8 |
| Example 69 | ○ | 6.5 | 4.9 | 75.4 | 18.7 | 9.5 | 50.8 |
| Example 70 | ○ | 6.5 | 4.9 | 75.4 | 18.7 | 9.5 | 50.8 |
| Comparative Example 11 | Δ | 6.4 | 3.8 | 59.4 | 18.4 | 6.6 | 35.9 |
| Comparative Example 12 | ⊚ | Not measured | | | | | |

TABLE 5

Evaluation 1

| Sample | Invisibility | 60-degree specular glossiness of support (%) | 60-degree specular glossiness of printed portion (%) | Ratio of 60-degree specular glossiness values (%) | 75-degree specular glossiness of support (%) | 75-degree specular glossiness of printed portion (%) | Ratio of 75-degree specular glossiness values (%) |
|---|---|---|---|---|---|---|---|
| Example 26 | ○ | 6.4 | 4.8 | 75.0 | 18.4 | 8.8 | 47.8 |
| Example 71 | ○ | 3.0 | 4.0 | 133.3 | 11.5 | 7.0 | 60.9 |
| Example 72 | ○ | 3.6 | 4.4 | 122.2 | 12.8 | 7.7 | 60.1 |
| Example 73 | ○ | 2.8 | 4.2 | 150.0 | 10.1 | 7.3 | 72.3 |
| Example 74 | ○ | Not measured | Not measured | | Not measured | Not measured | |
| Example 75 | ○ | Not measured | Not measured | | Not measured | Not measured | |
| Example 76 | ○ | Not measured | Not measured | | Not measured | Not measured | |

TABLE 5-continued

| | | Evaluation 1 | | | | | |
|---|---|---|---|---|---|---|---|
| Sample | Invisibility | 60-degree specular glossiness of support (%) | 60-degree specular glossiness of printed portion (%) | Ratio of 60-degree specular glossiness values (%) | 75-degree specular glossiness of support (%) | 75-degree specular glossiness of printed portion (%) | Ratio of 75-degree specular glossiness values (%) |
| Example 77 | ○ | Not measured | Not measured | | Not measured | Not measured | |
| Comparative Example 11 | △ | 6.4 | 3.8 | 59.4 | 18.4 | 6.6 | 35.9 |
| Comparative Example 12 | ◎ | Not measured | | | | | |

TABLE 6

| Sample | Evaluation 1 Invisibility | Evaluation 2 Nail Sensitivity | Nail intensity | Coin sensitivity | Coin intensity | Scratching dust | Evaluation 3 Soiling | Evaluation 4 Heat resistance | Evaluation 5 Writing pressure | Evaluation 6 Light resistance | Evaluation 7 Water resistance |
|---|---|---|---|---|---|---|---|---|---|---|---|
| Example 26 | ○ | ◎ | ◎ | ◎ | ◎ | ○ | ○ | ○ | ○ | ○ | ○ |
| Example 27 | ○ | ◎ | ◎ | ◎ | ◎ | ○ | ○ | ○ | ○ | ○ | ○ |
| Example 28 | ○ | ◎ | ◎ | ◎ | ◎ | ○ | ○ | ○ | ○ | ○ | ○ |
| Example 29 | ○ | ◎ | ◎ | ◎ | ◎ | ○ | △ | △ | ○ | △ | △ |
| Example 30 | ○ | ◎ | ◎ | ◎ | ◎ | ○ | ○ | ○ | ○ | ○ | ○ |
| Example 31 | ○ | ○ | ◎ | ○ | ◎ | ○ | ○ | ○ | ○ | ○ | ○ |
| Example 32 | ○ | ◎ | ◎ | ◎ | ◎ | ○ | ○ | ○ | ○ | ○ | ○ |
| Example 33 | ○ | ◎ | ◎ | ◎ | ◎ | ○ | ○ | ○ | ○ | ○ | ○ |
| Example 34 | ○ | ◎ | ◎ | ◎ | ◎ | ○ | ○ | ○ | ○ | ○ | ○ |
| Example 35 | ○ | ◎ | ○ | ◎ | ○ | ○ | ○ | ○ | ○ | ○ | ○ |
| Example 36 | ○ | ◎ | ◎ | ◎ | ◎ | ○ | ○ | ○ | ○ | ○ | ○ |
| Example 37 | ○ | ◎ | ◎ | ◎ | ◎ | ○ | ○ | ○ | ○ | ○ | ○ |
| Example 38 | ◎ | ◎ | ○ | ◎ | ○ | ○ | ◎ | ◎ | ◎ | ◎ | ◎ |
| Example 39 | ◎ | ◎ | ○ | ◎ | ○ | ○ | ◎ | ◎ | ◎ | ◎ | ◎ |
| Example 40 | ◎ | ◎ | ◎ | ◎ | ◎ | ○ | ◎ | ◎ | ◎ | ◎ | ◎ |
| Example 41 | ◎ | ◎ | ◎ | ◎ | ◎ | ○ | ◎ | ◎ | ◎ | ◎ | ◎ |
| Example 42 | ◎ | ◎ | ◎ | ◎ | ◎ | ○ | ◎ | ◎ | ◎ | ◎ | ◎ |
| Example 43 | ◎ | ◎ | ◎ | ◎ | ◎ | ○ | ◎ | ◎ | ◎ | ◎ | ◎ |
| Example 44 | ◎ | ◎ | ◎ | ◎ | ◎ | ○ | ◎ | ◎ | ◎ | ◎ | ◎ |
| Example 45 | ◎ | ◎ | ◎ | ◎ | ◎ | ○ | ◎ | ◎ | ◎ | ◎ | ◎ |
| Example 46 | ◎ | ◎ | ◎ | ◎ | ◎ | ○ | ◎ | ◎ | ◎ | ◎ | ◎ |
| Example 47 | ◎ | ○ | ◎ | ○ | ◎ | ○ | ◎ | ◎ | ◎ | ◎ | ◎ |
| Example 48 | ◎ | ◎ | ◎ | ◎ | ◎ | ○ | ◎ | ◎ | ◎ | ◎ | ◎ |
| Example 49 | ◎ | ◎ | ◎ | ◎ | ◎ | ○ | ◎ | ◎ | ◎ | ◎ | ◎ |
| Example 50 | ◎ | ○ | ◎ | ○ | ◎ | ○ | ◎ | ◎ | ◎ | ◎ | ◎ |
| Comparative Example 6 | ◎ | X | X | X | X | ○ | ◎ | ◎ | ◎ | ◎ | ◎ |
| Comparative Example 7 | ◎ | X | X | X | X | ○ | ◎ | ◎ | ◎ | ◎ | ◎ |
| Comparative Example 8 | ◎ | X | X | X | X | ○ | ◎ | ◎ | ◎ | ◎ | ◎ |
| Comparative Example 9 | ◎ | X | X | X | X | ○ | ◎ | ◎ | ◎ | ◎ | ◎ |
| Comparative Example 10 | ◎ | X | X | X | X | ○ | ◎ | ◎ | ◎ | ◎ | ◎ |
| Comparative Example 11 | △ | ○ | ○ | ○ | ○ | ○ | X | X | X | X | X |
| Comparative Example 12 | ◎ | ○ | ○ | ○ | ○ | X | ◎ | ◎ | ◎ | ◎ | ◎ |

TABLE 7

| Sample | Evaluation 1 Invisibility | Evaluation 2 | | | | | Evaluation 3 Soiling | Evaluation 4 Heat resistance | Evaluation 5 Writing pressure | Evaluation 6 Light resistance | Evaluation 7 Water resistance |
|---|---|---|---|---|---|---|---|---|---|---|---|
| | | Nail Sensi-tivity | Nail intensity | Coin sensi-tivity | Coin intensity | Scratching dust | | | | | |
| Example 26 | ○ | ◎ | ◎ | ◎ | ◎ | ○ | ○ | ○ | ○ | ○ | ○ |
| Example 51 | ◎ | ◎ | ○ | ◎ | ○ | ○ | ◎ | ◎ | ◎ | ◎ | ◎ |
| Example 52 | ◎ | ◎ | ○ | ◎ | ○ | ○ | ◎ | ◎ | ◎ | ◎ | ◎ |
| Example 53 | ◎ | ◎ | ○ | ◎ | ○ | ○ | ◎ | ◎ | ◎ | ◎ | ◎ |
| Example 54 | ○ | ◎ | ◎ | ◎ | ◎ | ○ | ○ | ○ | ○ | ○ | ○ |
| Example 55 | ○ | ◎ | ◎ | ◎ | ◎ | ○ | ○ | ○ | ○ | ○ | ○ |
| Example 56 | ○ | ◎ | ◎ | ◎ | ◎ | ○ | ○ | ○ | ○ | ○ | ○ |
| Example 57 | ○ | ◎ | ○ | ◎ | ○ | ○ | ○ | ○ | ○ | ○ | ○ |
| Example 58 | ○ | ○ | ○ | ○ | ○ | ○ | ○ | ○ | ○ | ○ | ○ |
| Example 59 | ○ | ○ | ○ | ○ | ○ | ○ | ○ | ○ | ○ | Δ | ○ |
| Example 60 | ○ | ○ | ○ | ○ | ○ | ○ | ○ | ○ | ○ | Δ | ○ |
| Comparative Example 11 | Δ | ○ | ○ | ○ | ○ | ○ | X | X | X | X | X |
| Comparative Example 12 | ◎ | ○ | ◎ | ○ | ◎ | X | ◎ | ◎ | ◎ | ◎ | ◎ |

TABLE 8

| Sample | Evaluation 1 Invisibility | Evaluation 2 | | | | | Evaluation 3 Soiling | Evaluation 4 Heat resistance | Evaluation 5 Writing pressure | Evaluation 6 Light resistance | Evaluation 7 Water resistance |
|---|---|---|---|---|---|---|---|---|---|---|---|
| | | Nail Sensi-tivity | Nail intensity | Coin sensitivity | Coin intensity | Scratching dust | | | | | |
| Example 26 | ○ | ◎ | ◎ | ◎ | ◎ | ○ | ○ | ○ | ○ | ○ | ○ |
| Example 61 | ○ | ○ | ◎ | ○ | ◎ | ○ | Δ | ○ | ○ | ○ | ○ |
| Example 62 | ○ | ◎ | ◎ | ◎ | ◎ | ○ | ○ | ○ | ○ | ○ | ○ |
| Example 63 | ○ | ◎ | ◎ | ◎ | ◎ | ○ | ○ | ○ | ○ | ○ | ○ |
| Example 64 | ○ | ◎ | ◎ | ◎ | ◎ | ○ | ○ | ○ | ○ | ○ | ○ |
| Example 65 | ○ | ◎ | ◎ | ◎ | ◎ | ○ | ○ | ○ | ○ | ○ | ○ |
| Example 66 | ○ | ◎ | ◎ | ◎ | ◎ | ○ | ○ | ○ | ○ | ○ | ○ |
| Example 67 | ○ | ◎ | ◎ | ◎ | ◎ | ○ | ○ | ○ | ○ | ○ | ○ |
| Example 68 | ○ | ◎ | ◎ | ◎ | ◎ | ○ | ○ | ○ | ○ | ○ | ○ |
| Example 69 | ○ | ◎ | ◎ | ◎ | ◎ | ○ | ○ | ○ | ○ | ○ | ○ |
| Example 70 | ○ | ◎ | ◎ | ◎ | ◎ | ○ | ○ | ○ | ○ | ○ | ○ |
| Comparative Example 11 | Δ | ○ | ○ | ○ | ○ | ○ | X | X | X | X | X |
| Comparative Example 12 | ◎ | ○ | ◎ | ○ | ◎ | X | ◎ | ◎ | ◎ | ◎ | ◎ |

TABLE 9

| Sample | Evaluation 1 Invisibility | Evaluation 2 | | | | | Evaluation 3 Soiling | Evaluation 4 Heat resistance | Evaluation 5 Writing pressure | Evaluation 6 Light resistance | Evaluation 7 Water resistance |
|---|---|---|---|---|---|---|---|---|---|---|---|
| | | Nail Sensi-tivity | Nail intensity | Coin sensi-tivity | Coin intensity | Scratching dust | | | | | |
| Example 26 | ○ | ◎ | ◎ | ◎ | ◎ | ○ | ○ | ○ | ○ | ○ | ○ |
| Example 71 | ○ | ◎ | ◎ | ◎ | ◎ | ○ | ○ | ○ | ○ | ○ | Δ |
| Example 72 | ○ | ◎ | ◎ | ◎ | ◎ | ○ | ○ | ○ | ○ | ○ | Δ |
| Example 73 | ○ | ◎ | ◎ | ◎ | ◎ | ○ | ○ | ○ | ○ | Δ | Δ |
| Example 74 | ○ | ◎ | ◎ | ◎ | ◎ | ○ | ○ | ○ | ○ | ○ | ○ |
| Example 75 | ○ | ◎ | ◎ | ◎ | ◎ | ○ | ○ | ○ | ○ | ○ | ○ |
| Example 76 | ○ | ◎ | ◎ | ◎ | ◎ | ○ | ○ | ○ | ○ | ○ | ○ |
| Example 77 | ○ | ◎ | ◎ | ◎ | ◎ | ○ | ○ | Δ | ○ | ○ | ○ |
| Comparative Example 11 | Δ | ○ | ○ | ○ | ○ | ○ | X | X | X | X | X |
| Comparative Example 12 | ◎ | ○ | ◎ | ○ | ◎ | X | ◎ | ◎ | ◎ | ◎ | ◎ |

From the above Tables 2 to 9, the invisible information printed sheets of Examples 26 to 77 were on practical levels (test participants' evaluation of Δ (triangle) or higher). Each evaluated matters will be discussed below.

With regard to invisibility, each Example was excellent, while Comparative Example 11 was poor. With regard to the 60-degree specular glossiness that is a corresponding property, that of each Example was 65% or more, while that of Comparative Example 11 was less than 60%. With regard to the 75-degree specular glossiness, that of each Example was 44% or more, while that of Comparative Example 11 was less than 36%.

With regard to an element relating to the invisibility, excellent invisibility was attained when a pigment was incorporated than when it was not incorporated. When the film thickness was in the range of the above Examples (0.3 μm-2.0 μm), excellent results were obtained.

The coloring sensitivity and the developed color intensity will be discussed below. Since the nail sensitivity and the coin sensitivity were mostly correlated to each other, and since the nail intensity and the coin intensity were correlated to each other, they will be discussed on the basis of the results by a finger nail.

In each Example, the nail sensitivity was excellent, and the nail intensity was also excellent. In Comparative Examples 6 to 10, both the sensitivity and the intensity were evaluated as x since some component required for color development was missing from the beginning.

The soiling, heat resistance, writing pressure, light resistance and water resistance will be discussed below.

In each Example, evaluations of these were generally excellent, but in Comparative Example 11, information was visualized due to color development, the collapse of an applied layer (a result of water resistance in Evaluation 7, etc.). Although not described in Evaluations, when the support was a heat-resistant support (woodfree paper, wood-containing paper, coated paper, a white PET film or a foamed PET film), each Example was by far more excellent in invisibility even by hot stamping at 110° C.

On the basis of the above results, attempts were made to further take advantage of the feature of the invisible information printed sheet of this invention. The results will be described in the following Examples.

Examples 78-82

Invisible information of only one-digit odd numerals were printed on a coated paper with one of the following scratch color-developable inks in the same manner as in Example 26, and further, one-digit even numerals were printed on the above coated paper with one of the dummy inks of Comparative Examples 1 to 5 in the same manner as in Comparative Example 6, and in this manner, invisible information printed sheets of Examples 78 to 82 were obtained.

Example Numbers of the scratch color-developable inks and Comparative Example Numbers of the dummy inks used in Examples 78 to 82 are shown below.

| Example | Scratch color-developable ink | Dummy ink |
|---|---|---|
| Example 78 | Example 1 | Comparative Example 1 |
| Example 79 | Example 2 | Comparative Example 2 |
| Example 80 | Example 3 | Comparative Example 3 |
| Example 81 | Example 4 | Comparative Example 4 |
| Example 82 | Example 5 | Comparative Example 5 |

(Evaluation of Examples 78 to 82)

The thus-obtained invisible information printed sheets were evaluated as described in Evaluations 1 to 7. In all of these, evaluations were nearly equivalent to those in Example 26, while the invisible information printed sheets in Examples 78 to 82 resulted in being remarkably excellent in light resistance over that of Example 26. After the light resistance test, there was no test participant who noticed that the invisible information in Examples 78 to 82 was the one-digit odd numerals.

Example 83

The invisible information on the invisible information printed sheet in Example 26 was limited to one-digit numerals alone, and further, one-digit even numerals were printed on the same coated paper with the scratch color-developable ink of Example 4 in the same manner as in Example 29, to give an invisible information printed sheet.

Example 84

The invisible information on the invisible information printed sheet in Example 28 was limited to one-digit numerals alone, and further, one-digit even numerals were printed on the same coated paper with the scratch color-developable ink of Example 4 in the same manner as in Example 29, to give an invisible information printed sheet.

Example 85

The invisible information on the invisible information printed sheet in Example 26 was limited to one-digit numerals alone, and further, one-digit even numerals were printed on the same coated paper with the scratch color-developable ink of Example 4 in the same manner as in Example 29. Furthermore, geometric patterns (a triangle, a square and a circle) were printed on the same coated paper with the scratch color-developable ink of Example 3 in the same manner as in Example 28, to give an invisible information printed sheet.

(Evaluations of Examples 83 to 85)

The thus-obtained invisible information printed sheets were evaluated as described in Evaluations 1 to 7. While excellent results were similarly obtained, colors obtained by scratching in Example 83 were two colors of an achromatic color and red (exactly, orange or reddish orange), and those in Example 84 were two colors of blue and red (exactly, orange or reddish orange), which were favorably accepted by the test participants.

In Example 85, three colors were obtained, which was more favorably accepted. Further, the colors were more easily discriminated.

Example 86

A scratch color-developable ink was obtained in the same manner as in Example 1 except that 100 parts by mass of the ink base (a-1) was replaced with 100 parts by mass of a mixture of 50 parts by mass of the ink base (a-1) with 50 parts by mass of the ink base (a-2).

Example 87

A scratch color-developable ink was obtained in the same manner as in Example 1 except that 200 parts by mass of the ink base (b-1) was replaced with 200 parts by mass of a mixture of 100 parts by mass of the ink base (b-2) with 100 parts by mass of the ink base (b-3).

Example 88

An invisible information printed sheet was obtained in the same manner as in Example 26 except that the scratch color-developable ink of Example 1 was replaced with the scratch color-developable ink of Example 86.

Example 89

An invisible information printed sheet was obtained in the same manner as in Example 26 except that the scratch color-developable ink of Example 1 was replaced with the scratch color-developable ink of Example 87.
(Evaluations of Examples 88 and 89)
The thus-obtained invisible information printed sheets were evaluated as described in Evaluations 1 to 7. In each Example, results similar to those in Example 27 were obtained.

With regard to specific examples using the azaphthalide compound as a dye precursor, first, Preparation Examples of Ink Bases Will be Described. The above ink bases were separately prepared, and hence are distinguished by adding the letter of z to the end of their ink base numbers.
(Preparation of Ink Base (a-1z))
50 parts by mass of the above varnish base, 30 parts by mass of 3-(1-ethyl-2-methylindol-3-yl)-3-(2-ethoxy-4-diethylaminophenyl)-4-azaphthalide as a dye precursor and 5 parts by mass of spindle oil were kneaded with a three-roll mill until the dye precursor had an average particle diameter of 2.0 μm. Further, 10 parts by mass of the above varnish base and 5 parts by mass of spindle oil were added to prepare an ink base (a-1z).
(Preparation of Ink Base (a-2z)
An ink base (a-2z) was prepared in the same manner as in the preparation of the ink base (a-1z) except that 30 parts by mass of crystal violet lactone was used as a dye precursor in place of 30 parts by mass of 3-(1-ethyl-2-methylindol-3-yl)-3-(2-ethoxy-4-diethylaminophenyl)-4-azaphthalide.
(Preparation of Ink Base (b-1z))
50 Parts by mass of the above varnish base, 30 parts by mass of 4-hydroxy-4'-isopropoxydiphenyl sulfone as a color developer and 5 parts by mass of spindle oil were kneaded with a three-roll mill until the color developer had an average particle diameter of 2.0 μm. Further, 10 parts by mass of the above varnish base and 5 parts by mass of spindle oil were added to prepare an ink base (b-1z).
(Preparation of Ink Base (b-2z))
An ink base (b-2z) was prepared in the same manner as in the preparation of the ink base (b-1z) except that 30 parts by mass of bis(3-allyl-4-hydroxyphenyl)sulfone was used as a color developer in place of 30 parts by mass of 4-hydroxy-4'-isopropoxydiphenyl sulfone.

Example 90

100 Parts by mass of the ink base (a-1z) and the 300 parts by mass of the ink base (b-1z) were mixed, 0.2 part by mass, based on the total amount of the above ink bases, of a dryer (manganese naphthenate) was added, and 10 parts by mass of spindle oil was also added. The mixture was homogenized by fully stirring it to give a scratch color-developable ink. The number of coarse particles having a particle diameter of 30 μm or more per gram of the thus-obtained ink was 100 pieces, and solid particles contained in the ink had an average particle diameter of 2.0 μm. The thus-obtained scratch color-developable ink was measured for an acid value in the same manner as in Example 1 to show 7 mgKOH/g.

Example 91

A scratch color-developable ink was obtained in the same manner as in Example 90 except that 300 parts by mass of the ink base (b-2z) was used in place of 300 parts by mass of the ink base (b-1z) (The number of coarse particles having a particle diameter of 30 μm or more per gram of the ink was 100 pieces).

Example 92

A scratch color-developable ink was obtained in the same manner as in Example 90 except that the amount of the ink base (a-1z) was changed to 70 parts by mass and that the amount of the ink base (b-1z) was changed to 330 parts by mass (The number of coarse particles having a particle diameter of 30 μm or more per gram of the ink was 100 pieces).

Example 93

A scratch color-developable ink was obtained in the same manner as in Example 90 except that the amount of the ink base (a-1z) was changed to 40 parts by mass and that the amount of the ink base (b-1z) was changed to 360 parts by mass (The number of coarse particles having a particle diameter of 30 μm or more per gram of the ink was 100 pieces).

Referential Example 1

A scratch color-developable ink was obtained in the same manner as in Example 90 except that 100 parts by mass of the ink base (a-2z) was used in place of 100 parts by mass of the ink base (a-1z).

Example 94

Preparation of Invisible Information Printed Sheet

One-digit Arabic numerals (halftone dot printing at a halftone ratio of 50%) of 0 to 9 and geometric patterns of a triangle, a square and a circle (halftone dot printing of insides of the triangle, square and circle at a halftone dot ratio of 30%) were offset-printed on a woodfree paper having a basis weight of 135 g/m² in an ink film thickness of 0.4 μm with the scratch color-developable ink obtained in Example 90, to give an invisible information printed sheet.

Examples 95-97

Invisible information printed sheets of Examples 95 to 97 were obtained in the same manner as in Example 94 except that the scratch color-developable inks obtained in Examples 91 to 93 were used in place of the scratch color-developable ink obtained in Example 90. The correspondence of Example Numbers of the scratch color-developable inks used and Example Numbers of the invisible information printed sheets is as follows

| Scratch color-developable ink | Invisible information printed sheet |
|---|---|
| Example 90 | Example 94 |
| Example 91 | Example 95 |
| Example 92 | Example 96 |
| Example 93 | Example 97 |

Referential Example 2

An invisible information printed sheet of Referential Example 2 was obtained in the same manner as in Example 94 except that the scratch color-developable ink obtained in Referential Example 1 was used in place of the scratch color-developable ink obtained in Example 90.

The following Evaluations include those which are similar to Evaluations 1 to 7, while the Evaluations were carried out separately from objects thereof, and all will be newly described below.

Evaluation 8 (Evaluation of Invisibility of Printed Portion)

The invisible information printed sheets obtained in Examples 94 to 97 and Referential Example 2 were visually observed and evaluated for invisibility on the basis of the following four ratings.

Results of evaluations by test participants including this Evaluation but excluding Evaluation 9 on scratching dust are results of evaluations by 20 test participants of twenties of age who were excellent in eyesight and attentiveness and familiar with existing concealed scratchcards. Ratings in Evaluation 8 are shown below. For visual recognition, the test participants were allowed to observe them obliquely and holding them to the light.

⊚ (double circle): 90% or more could not visually recognize the printed numerals.

○ (single circle): 80% or more could not visually recognize the printed numerals.

Δ (triangle): 60% or more could not visually recognize the printed numerals.

x: Less than 60% could not visually recognize the printed numerals.

Those who could visually recognize them appeared to read them out by combining together differences in an optical intensity, glossiness, concave-convex form, etc. In this test, all of Examples 94 to 97 and Referential Example 2 resulted in ⊚ (double circle) and had no difference.

Evaluation 9 (Evaluation of Coloring Sensitivity and Developed Color Intensity of Printed Portion)

Printed portions of the invisible information printed sheets obtained in Examples 94 to 97 and Referential Example 2 were scratched with a finger nail, to evaluate them for coloring sensitivity and developed color intensity. Further, they were scratched with a hundred yen coin to evaluate them in the same manner as in the finger nail case. Since the evaluation results by the finer nail and the hundred yen coin were like, the following description is made on the basis of the results by the finger nail. Examples 94 to 97 and Referential Example 2 were all excellent in coloring sensitivity and excellent with regard to scratching dust, and differences were made only with regard to the coloring sensitivity. Evaluation ratings will be first described below. Results having a difference will be described later together with other Evaluations.

Coloring Sensitivity

⊚ (double circle): 90% or more of the test participants could develop a color with a light force.

○ (single circle): 80% or more of the test participants could develop a color with a light force.

Δ (triangle): 80% or more but less than 80% of the test participants developed a color with a light force.

x: 50% or more of the test participants failed to develop a color.

Developed Color Intensity

⊚ (double circle): 90% or more of the test participants developed a color clearly, and all the participants could also read out the numerals.

○ (single circle): 80% or more of the test participants developed a color clearly, and all the participants could also read out the numerals.

Δ (triangle): Less than 80% of the test participants developed a color clearly, and 90% or more of the participants could also read out the numerals.

x: Less than 80% of the test participants developed a color clearly, and 10% or more of the participants could not read out the numerals.

Evaluation of Scratching Dust

Five test participants who could perform scratching carefully were selected, and were caused to develop a color on entire surface of the geometric pattern portion and its circumference for the evaluation. Not any one of Examples 94 to 97 and Referential Example 2 generated scratching dust, and there was no difference.

Evaluation 10 (Evaluation of Soiling on Printed Portion)

The invisible information printed sheets obtained in one of Examples 94 to 97 and Referential Example 2 were stacked one on the other with their printed portions kept in contact with each other, a top sheet was moved back and forth twice to rub against the other, and the printed surfaces were evaluated for soiling on the basis of the four ratings in the same manner as in Evaluation 8. The results in Examples 94 to 97 and Referential Example 2 were similar and had no difference.

Evaluation 11 (Evaluation of Heat Resistance of Printed Portion)

The invisible information printed sheets obtained in Examples 94 to 97 and Referential Example 2 were brought and kept in contact with a hot stamp at 100° C. for 5 seconds, and then evaluated by test participants with regard to the same contents as those in Evaluation 8. All of Examples 94 to 97 and Referential Example 2 showed results similar to those in the above Evaluation 8 and had no difference.

Evaluation 12 (Evaluation of Wiring Pressure Resistance of Printed Portion)

A copy paper was placed on the geometric pattern printed portion of each of the invisible information printed sheets obtained in Examples 94 to 97 and Referential Example 2, and Arabic numerals were written thereon with a ball-point pen. Then, the geometric pattern printed portion of each invisible information printed sheet was evaluated for color development degree of the Arabic numerals. In any one of Examples 94 to 97 and Referential Example 2, no color development by the ball-point pen was observed, and there was no difference.

Evaluation 13 (Evaluation of Light Resistance of Printed Portion)

The invisible information printed sheets obtained in Examples 94 to 97 and Referential Example 2 were exposed to sunlight for a total period of 24 hours, and evaluated by test participants with regard to the same contents as those in Evaluations 8 and 9 on the basis of similar ratings.

Evaluation 14 (Evaluation of Water Resistance of Printed Portion)

The invisible information printed sheets obtained in Examples 94 to 97 and Referential Example 2 were immersed in water and naturally dried, and they were evaluated by test participants with regard to the same contents as those in Evaluation 8. The results had no difference.

To sum up, the evaluation results had a difference only in the coloring sensitivity in Evaluation 9 and the invisibility and developed color density after the light resistance test in Evaluation 13, and the other evaluation results of all of Examples 94 to 97 and Referential Example 2 were excellent in spite of their severely set test conditions and evaluation ratings.

With regard to the evaluation items of which the results had a different, the results are as follows.

| Sample | Evaluation 9 (Developed color density) | Evaluation 13 (Invisibility) | Evaluation 13 (Developed color density) |
|---|---|---|---|
| Example 94 | ⊚ | ⊚ | ⊚ |
| Example 95 | ⊚ | ○ | ⊚ |
| Example 96 | ⊚ | ⊚ | ⊚ |
| Example 97 | ⊚ | ⊚ | ⊚ |
| Referential Example 2 | ○ | Δ | Δ |

It is seen from the above that the invisible information printed sheets of Examples 94 to 97 are excellent in the tests that are practically necessary and in particular excellent in light resistance. Therefore, the numerals-printed portions of the invisible information printed sheets obtained in Examples 94 to 97 and Referential Example 2 were caused to develop a color by scratching, and the sheets were placed under the same conditions as those in Evaluation 14 and then compared with respect to developed color intensity. In this case, each Example maintained ⊚ (double circle), while Referential Example resulted in Δ (triangle). In addition, when stored in a dark place, no change was found in the numerals-printed portions of all the invisible information printed sheets obtained in Examples 94 to 97 and Referential Example 2 even after one week so long as they were stored at room temperature.

It was unexpected that the above effects were produced in spite of having taken no measures for light resistance (ultraviolet absorbent, antioxidant, etc.) in any one of Examples 94 to 97, and it was further unexpected that the degree thereof was remarkable. For example, the invisibility is impaired even by a slight impairment of a printed portion, so that it can be said that the above effects are remarkable.

The evaluation results of the above Examples 94 to 97 and Referential Example 2 show differences in adaptability to use situations. Even when a user who develops a color by scratching leaves the invisible information printed sheet in a place where light is on for a long time before and after an scratching operation, the invisible information printed sheets of Examples 94 to 97 have durability.

INDUSTRIAL UTILITY

According to this invention, there can be provided a scratch color-developable ink that makes invisible information visible easily by scratching with a finger nail although the color of an invisible information printed portion is hard to develop by frictional contact during usual handling, that gives a high developed color intensity, that is free from the occurrence of dust during the visualization of invisible information and that makes it very difficult to visually recognize an invisible information printed portion without developing a color by scratching, and an invisible information printed sheet using the same.

As examples of practical use of this invention, the sheet of this invention enables the visualization of invisible information without any special tool (a coin, etc.) and is widely used in plays, games, education, lottery tickets, cash vouchers, lotteries, etc. Further, for identifying genuine printed matters or articles by scratching without using any tool, there is a way of using the scratch color-developable ink of this invention in which it is printed on those genuine products or their packages.

When used, the sheet of this invention requires the fingertip use and can hence expect a variety of derived usages. For example, it is suitable for infantile education, for prevention of agnosia/prevention of its progress and for teaching materials, rehabilitative materials, etc., in the field of rehabilitation training for regaining the move of fingers. It is a big advantage that a user has his or her eyes on information obtained by color development and keeps on feeling like trying without being bored or suffering pains.

Further, since no scratching dust occurs, it is effective for use in places and means of transport in particular (means of conveyance having a room such as an airplane, a vehicle, a train, a bus, a passenger ship, etc), and inside an office, banking facilities, public facilities, a home, a store, etc.). Labor for cleaning and air-conditioning apparatus maintenance can be saved.

In addition, since a printed material obtained by the use of the scratch color-developable ink of this invention is similar to printed materials obtained by usual offset printing inks in appearances such as glossiness, etc., it may be used in combination with various printed materials, or the scratch color-developable ink of the invention may be printed on a printed material, a printing paper, etc., to obtain the invisible information printed sheet of this invention.

The invention claimed is:

1. A scratch color-developable ink, comprising:
   an electron-donating colorless or light-color dye precursor,
   an electron-accepting color developer, and
   a binder resin-containing varnish,
   wherein a solid particle component contained therein has an average particle diameter of 0.3 to 25 μm, and
   the dye precursor and the color developer have an average particle diameter of 1 μm or more but 10 μm or less.

2. The scratch color-developable ink of claim 1, wherein the electron-donating colorless or light-color dye precursor and the electron-accepting color developer have a content mass ratio of 1:0.5 to 1:5.

3. The scratch color-developable ink of claim 1, wherein the electron-donating colorless or light-color dye precursor contains a xanthene compound and the electron-accepting color developer contains a diphenyl sulfone compound.

4. An invisible information printed sheet obtained by printing invisible information on a support with the scratch color-developable ink recited in claim 1.

5. The invisible information printed sheet of claim 4, wherein the invisible information printed has an ink film thickness of 2.0 μm or less.

6. The invisible information printed sheet of claim 4, wherein the ratio of glossiness of a printed portion to the glossiness of a non-printed portion on the support surface, as a ratio of 60-degree specular glossiness values according to JIS-K5701-1, is 65% to 150%.

7. The invisible information printed sheet of claim 4, wherein the ratio of glossiness of a printed portion to the glossiness of a non-printed portion on the support surface, as a ratio of 75-degree specular glossiness values according to JIS-K5701-1, is 44% to 105%.

8. The invisible information printed sheet of claim 4, wherein the invisible information is that which is printed by offset printing.

9. A scratch color-developable ink, comprising:
an electron-donating colorless or light-color dye precursor,
an electron-accepting color developer, and
a binder resin-containing varnish,
wherein the electron-donating colorless or light-color dye precursor is an azaphthalide compound which is not capsulated.

10. The scratch color-developable ink of claim 9, wherein the electron-accepting color developer is a color developer containing a diphenyl sulfone compound.

11. An invisible information printed sheet obtained by printing invisible information on a support with the scratch color-developable ink recited in claim 9.

12. The invisible information printed sheet of claim 11, wherein the invisible information printed has an ink film thickness of 2.0 μm or less.

13. The invisible information printed sheet of claim 11, wherein the ratio of glossiness of a printed portion to the glossiness of a non-printed portion on the support surface, as a ratio of 60-degree specular glossiness values according to JIS-K5701-1, is 65% to 150%.

14. The invisible information printed sheet of claim 11, wherein the ratio of glossiness of a printed portion to the glossiness of a non-printed portion on the support surface, as a ratio of 75-degree specular glossiness values according to JIS-K5701-1, is 44% to 105%.

15. The invisible information printed sheet of claim 11, wherein the invisible information is that which is printed by offset printing.

* * * * *